United States Patent
Ikeda et al.

(10) Patent No.: US 9,459,719 B2
(45) Date of Patent: Oct. 4, 2016

(54) INPUT-OUTPUT DEVICE AND METHOD FOR DRIVING THE SAME

(75) Inventors: Takayuki Ikeda, Kanagawa (JP); Yoshiyuki Kurokawa, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 294 days.

(21) Appl. No.: 13/160,860

(22) Filed: Jun. 15, 2011

(65) Prior Publication Data

US 2011/0310062 A1 Dec. 22, 2011

(30) Foreign Application Priority Data

Jun. 16, 2010 (JP) ................................. 2010-137080

(51) Int. Cl.
- *G06F 3/041* (2006.01)
- *G06F 3/042* (2006.01)
- *G02F 1/1333* (2006.01)

(52) U.S. Cl.
CPC ........... *G06F 3/0412* (2013.01); *G06F 3/0421* (2013.01); *G02F 1/13338* (2013.01)

(58) Field of Classification Search
CPC . G06F 3/0412; G06F 3/0421; G02F 1/13338
USPC .......... 178/18.09; 345/87–88, 173, 175–176, 345/207
See application file for complete search history.

(56) References Cited

U.S. PATENT DOCUMENTS

| 6,061,177 | A | * | 5/2000 | Fujimoto | ............... | G06F 3/0425 345/175 |
| 6,243,069 | B1 | | 6/2001 | Ogawa et al. | | |
| 6,747,638 | B2 | | 6/2004 | Yamazaki et al. | | |
| 7,009,663 | B2 | * | 3/2006 | Abileah | ............... | G02F 1/13338 345/175 |
| 7,271,835 | B2 | | 9/2007 | Iizuka et al. | | |
| 7,522,149 | B2 | * | 4/2009 | Nakamura | ............ | G06F 3/0421 178/18.01 |
| 7,525,523 | B2 | | 4/2009 | Yamazaki et al. | | |
| 7,663,165 | B2 | | 2/2010 | Mouli | | |

(Continued)

FOREIGN PATENT DOCUMENTS

| EP | 1 610 210 A1 | 12/2005 |
| JP | 11-8741 | 1/1999 |

(Continued)

OTHER PUBLICATIONS

Tanaka, K. et al, "45.5: A System LCD with Optical Input Function Using Infra-Red Backlight Subtraction Scheme," SID Digest '01: SID International Symposium Digest of Technical Papers, 2010, pp. 680-683.

(Continued)

*Primary Examiner* — Matthew Fry
(74) *Attorney, Agent, or Firm* — Husch Blackwell LLP

(57) ABSTRACT

To increase the light detection accuracy, a method for driving an input-output device that includes a first light unit, a second light unit, a display circuit, and Y light detection circuits (Y is a natural number of 2 or more) is proposed. The same light-detection control signal is input to the Y light detection circuits. In a frame period set by a display selection signal, the first light unit is lit by sequentially switching Z light-emitting diodes and emitting light, and the second light unit is lit by making the white light-emitting diode emit light when the first light unit is not lit. In a period when the second light unit is lit, Y pieces of data corresponding to the illuminance of light entering the Y light detection circuits are generated.

22 Claims, 17 Drawing Sheets

(56) References Cited

U.S. PATENT DOCUMENTS

| | | |
|---|---|---|
| 7,674,650 B2 | 3/2010 | Akimoto et al. |
| 7,868,326 B2 * | 1/2011 | Sano et al. .................. 257/58 |
| 8,400,428 B2 | 3/2013 | Kurokawa et al. |
| 8,508,506 B2 | 8/2013 | Onishi |
| 2005/0134751 A1 * | 6/2005 | Abileah et al. ............... 349/42 |
| 2006/0071147 A1 * | 4/2006 | Dai ........................... 250/208.1 |
| 2006/0103637 A1 * | 5/2006 | Yamaguchi et al. ......... 345/175 |
| 2006/0157760 A1 | 7/2006 | Hayashi et al. |
| 2006/0187183 A1 * | 8/2006 | Naka et al. .................. 345/102 |
| 2006/0192766 A1 * | 8/2006 | Nakamura ........... G06F 3/0421 345/173 |
| 2007/0018075 A1 | 1/2007 | Cazaux et al. |
| 2008/0054319 A1 | 3/2008 | Mouli |
| 2009/0101948 A1 | 4/2009 | Park et al. |
| 2009/0295769 A1 | 12/2009 | Yamazaki et al. |
| 2010/0007632 A1 | 1/2010 | Yamazaki |
| 2010/0060611 A1 * | 3/2010 | Nie ....................... G06F 1/3203 345/175 |
| 2010/0117991 A1 | 5/2010 | Koyama et al. |
| 2010/0134443 A1 * | 6/2010 | Nakamura ............. G06F 3/042 345/175 |
| 2010/0182282 A1 | 7/2010 | Kurokawa et al. |
| 2010/0238334 A1 * | 9/2010 | Takahashi ..................... 348/305 |
| 2010/0289755 A1 * | 11/2010 | Zhu ........................ G06F 3/042 345/173 |
| 2010/0295821 A1 * | 11/2010 | Chang .................... G06F 3/0421 345/175 |
| 2011/0069020 A1 * | 3/2011 | Kim ...................... G06F 3/0412 345/173 |
| 2011/0122075 A1 * | 5/2011 | Seo ........................ G06F 3/042 345/173 |
| 2011/0176038 A1 | 7/2011 | Kurokawa et al. |
| 2011/0215323 A1 | 9/2011 | Kurokawa et al. |
| 2011/0216042 A1 * | 9/2011 | Wassvik ................ G06F 3/0412 345/175 |
| 2011/0221723 A1 | 9/2011 | Kurokawa et al. |
| 2011/0234535 A1 * | 9/2011 | Hung .................... G06F 3/0425 345/175 |

FOREIGN PATENT DOCUMENTS

| | | |
|---|---|---|
| JP | 2004-318819 A | 11/2004 |
| JP | 2007-65239 | 3/2007 |
| JP | 2009-129152 A | 6/2009 |
| JP | 2009-157605 A | 7/2009 |
| JP | 2009-187342 | 8/2009 |
| JP | 2010-015969 A | 1/2010 |
| JP | 2010-097420 A | 4/2010 |
| JP | 2010-108489 A | 5/2010 |
| WO | WO 2007/013272 A1 | 2/2007 |

OTHER PUBLICATIONS

Jeon, S. et al, "180nm Gate Length Amorphous InGaZnO Thin Film Transistor for High Density Image Sensor Applications," IEDM 10: Technical Digest of International Electron Devices Meeting, Dec. 6, 2010, pp. 504-507.

Tanaka, K. et al, "45.5: A System LCD with Optical Input Function Using Infra-Red Backlight Subtraction Scheme," SID Digest '10: SID International Symposium Digest of Technical Papers, 2010, pp. 680-683.

* cited by examiner

INPUT-OUTPUT DEVICE AND METHOD FOR DRIVING THE SAME

BACKGROUND OF THE INVENTION

1. Field of the Invention

One embodiment of the present invention relates to an input-output device. Another embodiment of the present invention relates to a method for driving an input-output device.

2. Description of the Related Art

In recent years, devices having a function of outputting data and a function of inputting data with incident light (such devices are also referred to as input-output devices) have been developed.

An example of an input-output device is an input-output device that includes a pixel portion including a plurality of light detection circuits (also referred to as optical sensors) arranged in the row and column directions and, as a light source, a backlight including light-emitting diodes of a plurality of colors (e.g., Patent Document 1). In the input-output device disclosed in Patent Document 1, in each frame period, the backlight is lit while colors of emitted light are switched to display a full-color image, and light reflected by an object subjected to reading is read as data. That is, the input-output device disclosed in Patent Document 1 functions as a touch panel. Note that a method in which a backlight is lit while colors of emitted light are switched in each frame period is called a field sequential method.

REFERENCE

Patent Document 1: Japanese Published Patent Application No. H11-008741

SUMMARY OF THE INVENTION

A conventional input-output device has a problem of low light detection accuracy.

For example, a conventional input-output device employs a rolling shutter method in which light detection circuits in each row generate and output data corresponding to the illuminance of incident light (such data is referred to as optical data). In the case where the conventional input-output device employs a field sequential method, a plurality of light-emitting diodes need to be sequentially switched and emit light in one frame period so as to switch lighting states of the backlight. Therefore, in order to generate optical data corresponding to each lighting state of the backlight, the light detection circuits in each row need to generate optical data so that optical data is generated in all the light detection circuits in a period during which the backlight is lit. Consequently, a time in which light enters each light detection circuit at the time of generating optical data is short, so that the light detection accuracy is decreased.

In addition, for example, light in the environment where the input-output device is positioned, such as external light, enters the input-output device. Such environmental light causes noise when optical data is generated, so that the light detection accuracy is reduced. For example, in the case where data is input to the input-output device when light reflected by a finger enters the light detection circuit as in a touch panel, environmental light sometimes causes the light reflected by the finger and light reflected by a hand portion other than the finger to be recognized as equivalent data.

An object of one embodiment of the present invention is to increase the light detection accuracy.

According to one embodiment of the present invention, an input-output device includes a display circuit, a plurality of light detection circuits, a first light unit including a plurality of first light-emitting diodes, and a second light unit including a second light-emitting diode and a light guide plate. Light from the second light-emitting diode enters the light guide plate. The first light unit is lit by sequentially switching the plurality of first light-emitting diodes and emitting light every unit period. The second light unit is lit by making the second light-emitting diode emit light when the first light unit is not lit. The plurality of light detection circuits generate optical data in accordance with the same signal when the second light unit is lit in the unit period. Accordingly, adverse effects of light in the environment where the input-output device is positioned are suppressed.

One embodiment of the present invention is an input-output device that includes a first light unit including Z light-emitting diodes (Z is a natural number of 3 or more); a second light unit including a white light-emitting diode and a light guide plate on which light from the white light-emitting diode is incident; X display circuits (X is a natural number) provided between the first light unit and the second light unit, supplied with a display selection signal, supplied with a display data signal in accordance with the display selection signal, and set in a display state corresponding to data of the inputted display data signal; and Y light detection circuits (Y is a natural number of 2 or more) provided between the first light unit and the second light unit, supplied with the same light-detection control signal, and configured to generate data corresponding to illuminance of incident light in accordance with the inputted light-detection control signal.

One embodiment of the present invention is a method for driving an input-output device that includes a first light unit including Z light-emitting diodes (Z is a natural number of 3 or more); a second light unit including a white light-emitting diode and a light guide plate on which light from the white light-emitting diode is incident; X display circuits (X is a natural number) provided between the first light unit and the second light unit, supplied with a display selection signal, supplied with a display data signal in accordance with the display selection signal, and set in a display state corresponding to data of the inputted display data signal; and Y light detection circuits (Y is a natural number of 2 or more) provided between the first light unit and the second light unit, supplied with a light-detection control signal, and configured to generate data corresponding to illuminance of incident light in accordance with the inputted light-detection control signal. The same light-detection control signal is input to the Y light detection circuits. In a frame period set by the display selection signal, the first light unit is lit by sequentially switching the Z light-emitting diodes and emitting light, and the second light unit is lit by making the white light-emitting diode emit light when the first light unit is not lit. Y pieces of data corresponding to illuminance of light incident on the Y light detection circuits are generated in a period when the second light unit is lit.

Another embodiment of the present invention is a method for driving an input-output device that includes a first light unit including Z light-emitting diodes (Z is a natural number of 3 or more); a second light unit including a white light-emitting diode and a light guide plate on which light from the white light-emitting diode is incident; X display circuits (X is a natural number) provided between the first light unit and the second light unit, supplied with a display selection signal, supplied with a display data signal in accordance with the display selection signal, and set in a display state corresponding to data of the inputted display data signal; and Y light detection circuits (Y is a natural number of 2 or more) provided between the first light unit and the second light unit, supplied with a light-detection control signal, and configured to generate data corresponding to illuminance of incident light in accordance with the inputted light-detection control signal. The same light-detection control signal is input to the Y light detection circuits. In a frame period set by the display selection signal, the first light unit is lit by sequentially switching the Z light-emitting diodes and emitting light, and the second light unit is lit by making the white light-emitting diode emit light when the first light unit is not lit. Y pieces of first data corresponding to illuminance of light incident on the Y light detection circuits are generated in a period when the second light unit is lit, and Y pieces of second data corresponding to illuminance of light incident on the Y light detection circuits are generated in a period when the first light unit and the second light unit are not lit. Third data that is data of difference between the first data and the second data is generated.

According to one embodiment of the present invention, the light detection accuracy can be increased.

DETAILED DESCRIPTION OF THE INVENTION

Examples of embodiments for explaining the present invention will be described below with reference to the accompanying drawings. Note that the present invention is not limited to the description below, and it is easily understood by those skilled in the art that various changes and modifications can be made without departing from the spirit and scope of the present invention. Therefore, the present invention should not be interpreted as being limited to the following description of the embodiments.

Note that the contents in different embodiments can be combined with each other as appropriate. In addition, the contents in different embodiments can be replaced with each other.

Embodiment 1

In this embodiment, an input-output device that can output data and can input data with incident light will be described.

Figure 1A:
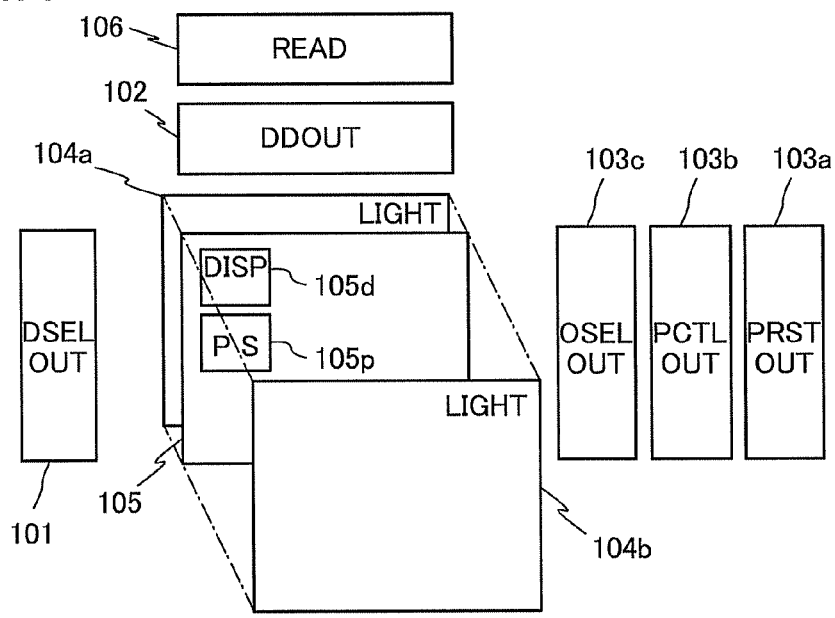
FIGS. 1A to 1C illustrate an example of an input-output device in Embodiment 1.
Figure 1B:
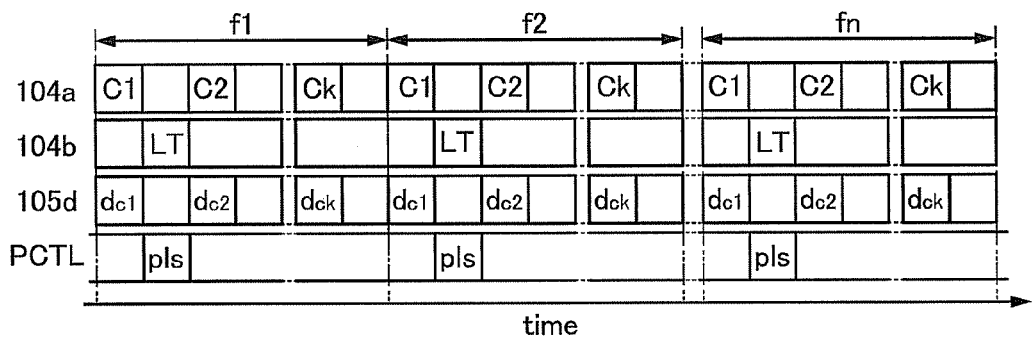
Figure 1C:
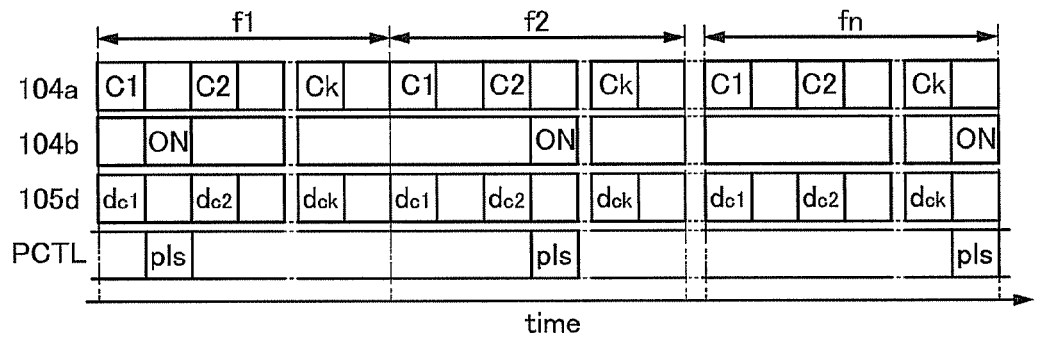

An example of an input-output device in this embodiment will be described with reference to FIGS. 1A to 1C. FIGS. 1A to 1C are diagrams for explaining an example of the input-output device in this embodiment.

First, a structural example of the input-output device in this embodiment will be described with reference to FIG. 1A. FIG. 1A is a schematic diagram illustrating the structural example of the input-output device in this embodiment.

The input-output device illustrated in FIG. 1A includes a display selection signal output circuit (DSELOUT) 101, a display data signal output circuit (DDOUT) 102, a light-detection reset signal output circuit (PRSTOUT) 103*a*, a light-detection control signal output circuit (PCTLOUT) 103*b*, an output selection signal output circuit (OSELOUT) 103*c*, a light unit (LIGHT) 104*a*, a light unit 104*b*, X display circuits (DISP, X is a natural number) 105*d*, Y light detection circuits (PS, Y is a natural number of 2 or more) 105*p*, and a read circuit (READ) 106.

The display selection signal output circuit 101 has a function of outputting a plurality of display selection signals (signals DSEL) which are pulse signals.

The display selection signal output circuit 101 includes a shift register, for example. The display selection signal output circuit 101 can output a display selection signal by output of a pulse signal from the shift register.

An image signal which is an electric signal for displaying an image is input to the display data signal output circuit 102. The display data signal output circuit 102 has a function of generating a display data signal (a signal DD) which is a voltage signal on the basis of the inputted image signal and outputting the generated display data signal.

The display data signal output circuit 102 includes a transistor, for example.

In the input-output device, the transistor has two terminals and a current control terminal that controls a current flowing between the two terminals with an applied voltage. Note that without limitation to the transistor, terminals where a current flowing therebetween is controlled are referred to as current terminals. Two current terminals are also referred to as a first current terminal and a second current terminal.

In the input-output device, the transistor can be a field-effect transistor, for example. In a field-effect transistor, a first current terminal is one of a source and a drain, a second current terminal is the other of the source and the drain, and a current control terminal is a gate.

Voltage generally refers to a difference between potentials at two points (also referred to as a potential difference). However, values of both a voltage and a potential are sometimes expressed in volts (V) in a circuit diagram or the like, so that it is difficult to distinguish between them. Therefore, in this specification, a potential difference between a potential at one point and a potential to be the reference (also referred to as a reference potential) is used as a voltage at the point in some cases.

The display data signal output circuit 102 can output data of an image signal as a display data signal when the transistor is on. The transistor can be controlled by input of a control signal which is a pulse signal to the current control terminal. In the case where there are a plurality of display circuits 105d, the display data signal output circuit 102 may output data of an image signal as a plurality of display data signals by selectively turning on or off a plurality of transistors.

The light-detection reset signal output circuit 103a has a function of outputting a light-detection reset signal (a signal PRST) which is a pulse signal.

The light-detection reset signal output circuit 103a includes a shift register, for example. The light-detection reset signal output circuit 103a can output a light-detection reset signal by output of a pulse signal from the shift register.

The light-detection control signal output circuit 103b has a function of outputting a light-detection control signal (a signal PCTL) which is a pulse signal.

The light-detection control signal output circuit 103b includes a shift register, for example. The light-detection control signal output circuit 103b can output a light-detection control signal by output of a pulse signal from the shift register.

The output selection signal output circuit 103c has a function of outputting an output selection signal (a signal OSEL) which is a pulse signal.

The output selection signal output circuit 103c includes a shift register, for example. The output selection signal output circuit 103c can output an output selection signal by output of a pulse signal from the shift register.

Each of the light units 104a and 104b is a light-emitting unit including a light source.

The light unit 104a includes Z light-emitting diodes (LEDs) A (Z is a natural number of 3 or more) as light sources. The Z light-emitting diodes A are light-emitting diodes that emit light with a wavelength in the visible light region (e.g., a region with a wavelength of 360 nm to 830 nm). As the Z light-emitting diodes A, a red light-emitting diode, a green light-emitting diode, and a blue light-emitting diode can be used, for example. Note that the number of light-emitting diodes of different colors may be more than one. Alternatively, as the Z light-emitting diodes A, a light-emitting diode of another color (e.g., a white light-emitting diode) may be used in addition to the red, green, and blue light-emitting diodes.

For example, light emission of the light-emitting diodes A may be controlled using a control signal that selects a light-emitting diode A to which a voltage is applied. Further, the light unit 104a may be provided with a light control circuit for outputting a control signal that controls whether to select a light-emitting diode A to which a voltage is applied.

The light unit 104b includes a light-emitting diode B as a light source and a light guide plate. The light-emitting diode B emits light with a wavelength in the visible light region. As the light-emitting diode, a white light-emitting diode can be used, for example. Note that the number of white light-emitting diodes may be more than one. Light from the light-emitting diode B enters the light guide plate.

For example, when an object to be read is in contact with the light guide plate while the light unit 104b having the above structure is on, light from the light source is scattered at the contact portion of the object and the light guide plate and enters the light detection circuit 105p.

For example, light emission of the light-emitting diode B may be controlled using a control signal that selects a light-emitting diode B to which a voltage is applied. Further, the light unit 104b may be provided with a light control circuit for outputting a control signal that controls whether to select a light-emitting diode B to which a voltage is applied.

The display circuit 105d is provided between the light unit 104a and the light unit 104b. To the display circuit 105d, a display selection signal which is a pulse signal is input, and a display data signal is input in accordance with the inputted display selection signal. The display circuit 105d changes its display state in accordance with data of the inputted display data signal.

The display circuit 105d includes a display selection transistor and a display element, for example.

The display selection transistor has a function of selecting whether data of a display data signal is input to the display element.

The display element changes its display state corresponding to data of a display data signal by input of the data of the display data signal with the display selection transistor.

As the display element, a liquid crystal element can be used, for example.

Examples of a display method of the input-output device including a liquid crystal element are a TN (twisted nematic) mode, an IPS (in-plane switching) mode, a STN (super twisted nematic) mode, a VA (vertical alignment) mode, an ASM (axially symmetric aligned micro-cell) mode, an OCB (optically compensated birefringence) mode, an FLC (ferroelectric liquid crystal) mode, an AFLC (antiferroelectric liquid crystal) mode, an MVA (multi-domain vertical alignment) mode, a PVA (patterned vertical alignment) mode, an ASV (advanced super view) mode, and a FFS (fringe field switching) mode.

The light detection circuit 105p is provided between the light unit 104a and the light unit 104b. A light-detection reset signal, a light-detection control signal, and an output selection signal are input to the light detection circuit 105p.

The light detection circuit 105p is reset in accordance with the light-detection reset signal.

In addition, the light detection circuit 105p has a function of generating data corresponding to the illuminance of incident light (such data is also referred to as optical data) in accordance with the light-detection control signal.

The light detection circuit 105p also has a function of outputting the generated optical data as an optical data signal in accordance with the output selection signal.

The light detection circuit 105p includes, for example, a photoelectric conversion element (PCE), a light-detection reset selection transistor, a light-detection control transistor, an amplification transistor, and an output selection transistor.

When light enters the photoelectric conversion element, a current (also referred to as a photocurrent) flows through the photoelectric conversion element in accordance with the illuminance of incident light.

A current control terminal of the light-detection reset selection transistor is supplied with a light-detection reset signal. The light-detection reset selection transistor has a function of selecting whether the voltage of a current control terminal of the amplification transistor is set to a reference value.

A current control terminal of the light-detection control transistor is supplied with a light-detection control signal. The light-detection control transistor has a function of controlling whether the voltage of the current control terminal of the amplification transistor is set to a value corresponding to the photocurrent flowing through the photoelectric conversion element.

A current control terminal of the output selection transistor is supplied with an output selection signal. The output selection transistor has a function of selecting whether optical data is output as an optical data signal from the light detection circuit 105*p*.

The light detection circuit 105*p* outputs optical data as an optical data signal from a first current terminal or a second current terminal of the amplification transistor.

The display circuit 105*d* and the light detection circuit 105*p* are provided in a pixel portion 105. The pixel portion 105 is a region in which data is displayed and read. A pixel includes at least one display circuit 105*d*. The pixel may further include at least one light detection circuit 105*p*. When there are a plurality of display circuits 105*d*, the display circuits 105*d* may be arranged in the row and column directions in the pixel portion 105, for example. Furthermore, when there are a plurality of light detection circuits 105*p*, the light detection circuits 105*p* may be arranged in the row and column directions in the pixel portion 105, for example.

The read circuit 106 has a function of selecting a light detection circuit 105*p* from which optical data is to be read and reading optical data from the selected light detection circuit 105*p*.

The read circuit 106 is formed using, for example, a selection circuit. For example, the selection circuit includes a transistor. The selection circuit can read optical data by input of an optical data signal from the light detection circuit 105*p* with the transistor, for example.

Next, as an example of a method for driving the input-output device in this embodiment, an example of a method for driving the input-output device illustrated in FIG. 1A will be described with reference to FIGS. 1B and 1C. FIGS. 1B and 1C are timing charts each illustrating an example of a method for driving the input-output device in FIG. 1A.

In the example of a method for driving the input-output device in FIG. 1A, the same light-detection control signal is input to the Y light detection circuits 105*p*. In frame periods (e.g., frame periods f1 to fn illustrated in FIGS. 1B and 1C) set in accordance with a display selection signal, the Z light-emitting diodes in the light unit 104*a* are sequentially switched and emit light so that the light unit 104*a* sequentially switches its lighting state from a lighting state C1 (a state where the first light-emitting diode A emits light) to a lighting state Ck (a state where the Z-th light-emitting diode A emits light). In FIGS. 1B and 1C, the light unit 104*a* is off in an interval between two successive periods during which the light unit 104*a* is on.

A display data signal is input to the display circuit 105*d* in accordance with the display selection signal. When the light unit 104*a* is on, the display circuit 105*d* is put in a display state corresponding to data of the display data signal. For example, when the light unit 104*a* is in the lighting state C1, the display circuit 105*d* is put in a display state dc1 (a display state corresponding to the lighting state C1). When the light unit 104*a* is in the lighting state C2, the display circuit 105*d* is put in a display state dc2 (a display state corresponding to the lighting state C2). When the light unit 104*a* is in the lighting state Ck, the display circuit 105*d* is put in a display state dck (a display state corresponding to the lighting state Ck).

Further, when the light unit 104*a* is off, the light-emitting diode B is made to emit light and the light unit 104*b* is brought into a lighting state LT. Note that the cycle of switching the state of the light unit 104*b* from a non-lighting state to a lighting state is preferably longer than 0 seconds and shorter than or equal to 1/60 seconds. Thus, flickers of display images due to blinking of the light unit 104*b* can be suppressed.

When the light unit 104*b* is in the lighting state LT, a pulse (shown as pls) of the light-detection control signal is input to the Y light detection circuits 105*p*. At this time, each of the Y light detection circuits 105*p* generates optical data. Note that when the cycle of the pulse of the light-detection control signal is made longer than the cycle of switching the lighting state of the light unit 104*a*, a period during which optical data is not output when the light unit 104*a* is off can be provided, for example. Consequently, a period during which the light unit 104*a* is off can be efficiently used at the time of generating optical data; thus, a period during which light enters the light detection circuit at the time of generating optical data can be set longer. In addition, optical data can be output regardless of the lighting state of the light unit, so that the operation frequency of the light detection circuit can be lowered and power consumption can be reduced.

Further, the Y light detection circuits 105*p* output the generated optical data as optical data signals to the read circuit 106 in accordance with output selection signals, whereby the optical data is read.

Note that the timing of when the light unit 104*b* is lit may be the same or different in frame periods.

For example, in the timing chart in FIG. 1B, in each frame period, optical data is generated by the light detection circuit 105*p* in a period when the light unit 104*a* is in a non-lighting state between the lighting state C1 and the lighting state C2.

In addition, for example, in the timing chart in FIG. 1C, optical data is generated by the light detection circuit 105*p* in a different period when the light unit 104*a* is in a non-lighting state, depending on frame periods.

As described with FIGS. 1A to 1C, the input-output device exemplified in this embodiment includes a display circuit, a plurality of light detection circuits, a first light unit, and a second light unit including a light guide plate. Light from a light source enters the light guide plate. With the above structure, light reflected by an object to be read can enter the light detection circuit only when the object is in contact with the light guide plate in the second light unit; thus, the light detection accuracy can be improved.

In addition, in the input-output device exemplified in this embodiment, the same light-detection control signal is input to the Y light detection circuits. With the above structure, a time necessary for all the light detection circuits to generate optical data can be made shorter, and a period during which light enters the light detection circuit at the time of generating optical data can be set longer. Further, the operation frequency of the light detection circuit can be lowered, and power consumption can be reduced. Note that a method where the same light-detection control signal is input to a plurality of light detection circuits is called a global shutter method.

Furthermore, in the input-output device exemplified in this embodiment, the first light unit is lit while a plurality of light-emitting diodes are sequentially switched and emit light. With the above structure, the input-output device can display full-color images.

Further, in the input-output device exemplified in this embodiment, by inputting the same light-detection control signal to the Y light detection circuits, the second light unit is on when the first light unit is off, and optical data can be generated in a plurality of light detection circuits when the second light unit is on. With the above structure, the influence of the first and second light units on display images can be reduced. Moreover, the influence of display images on optical data can be reduced.

The light detection accuracy can be therefore improved with the above-described structure.

Embodiment 2

In this embodiment, another example of the input-output device in Embodiment 1 will be described. Note that the description of Embodiment 1 is employed as appropriate for the same portions as those in Embodiment 1.

Figure 2A:
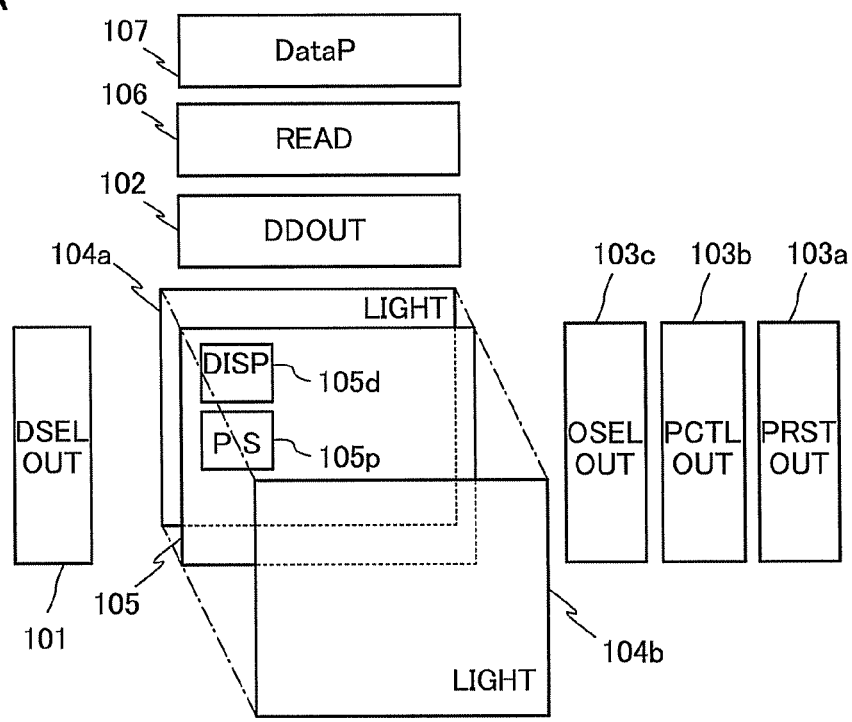
FIGS. 2A and 2B illustrate an example of an input-output device in Embodiment 2.
Figure 2B:
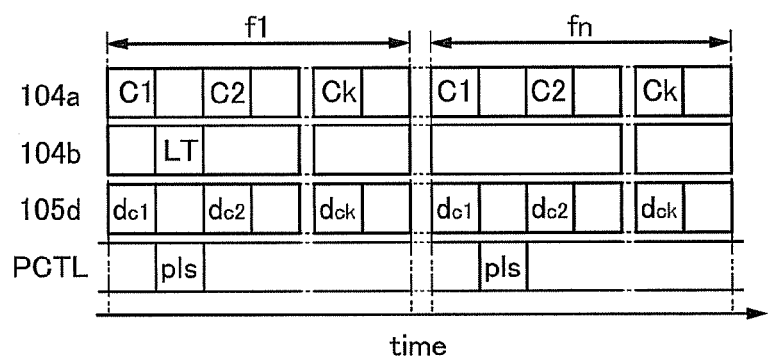

An example of an input-output device in this embodiment will be described with reference to FIGS. 2A and 2B. FIGS. 2A and 2B are diagrams for explaining an example of the input-output device in this embodiment.

First, a structural example of the input-output device in this embodiment will be described with reference to FIG. 2A. FIG. 2A is a schematic diagram illustrating the structural example of the input-output device in this embodiment.

The input-output device illustrated in FIG. 2A includes a display selection signal output circuit 101, a display data signal output circuit 102, a light-detection reset signal output circuit 103a, a light-detection control signal output circuit 103b, an output selection signal output circuit 103c, a light unit 104a, a light unit 104b, X display circuits 105d, Y light detection circuits 105p, a read circuit 106, and a data processing circuit (DataP) 107.

The display selection signal output circuit 101, the display data signal output circuit 102, the light-detection reset signal output circuit 103a, the light-detection control signal output circuit 103b, the output selection signal output circuit 103c, the light unit 104a, the light unit 104b, the display circuit 105d, the light detection circuit 105p, and the read circuit 106 are the same as those in the input-output device illustrated in FIG. 1A; therefore, the description of the components in the input-output device in FIG. 1A is employed as appropriate.

The data processing circuit 107 performs arithmetic processing on data of an inputted data signal. The data processing circuit 107 includes a memory circuit and an arithmetic circuit. The memory circuit has a function of storing data of the data signal. The arithmetic circuit has a function of generating data of difference between data in a plurality of data signals by arithmetic processing.

Note that the data processing circuit 107 may be included in the input-output device; alternatively, a separate data processing means having a function equivalent to that of the data processing circuit (e.g., a personal computer) may be electrically connected to the input-output device. When the data processing circuit 107 is provided in the input-output device, the number of wirings in a portion where the data processing circuit 107 and the read circuit 106 are connected to each other can be reduced, for example.

Next, as an example of a method for driving the input-output device in this embodiment, an example of a method for driving the input-output device illustrated in FIG. 2A will be described with reference to FIG. 2B. FIG. 2B is a timing chart illustrating an example of a method for driving the input-output device in FIG. 2A.

In the example of a method for driving the input-output device in FIG. 2A, the same light-detection control signal is input to the Y light detection circuits 105p. In frame periods (e.g., frame periods f1 to fn illustrated in FIG. 2B) set in accordance with a display selection signal, the first to Z-th light-emitting diodes A in the light unit 104a are sequentially switched and emit light so that the light unit 104a sequentially switches its lighting state from the lighting state C1 (the state where the first light-emitting diode A emits light) to the lighting state Ck (the state where the Z-th light-emitting diode A emits light) as illustrated in FIG. 2B. Further, the light unit 104a is off between the lighting states.

A display data signal is input to the display circuit 105d in accordance with the display selection signal. When the light unit 104a is on, the display circuit 105d is put in a display state corresponding to data of the display data signal. For example, when the light unit 104a is in the lighting state C1, the display circuit 105d is put in a display state dc1 (a display state corresponding to the lighting state C1). When the light unit 104a is in the lighting state C2, the display circuit 105d is put in a display state dc2 (a display state corresponding to the lighting state C2). When the light unit 104a is in the lighting state Ck, the display circuit 105d is put in a display state dck (a display state corresponding to the lighting state Ck).

Further, when the light unit 104a is off, a light-emitting diode B is made to emit light and the light unit 104b is brought into a lighting state LT.

When the light unit 104b is on, a pulse of the light-detection control signal is input to the Y light detection circuits 105p. At this time, each of the Y light detection circuits 105p generates optical data.

Further, the Y light detection circuits 105p output the generated optical data as optical data signals to the read circuit 106 in accordance with output selection signals, whereby the optical data is read. The read optical data is stored in the memory circuit in the data processing circuit 107.

In addition, when the light units 104a and 104b are off in a frame period (the frame period fn in FIG. 2B) that is different from the above frame period, a pulse of the light-detection control signal is input to the Y light detection circuits 105p. At this time, each of the Y light detection circuits 105p generates optical data.

Further, the Y light detection circuits 105p output the generated optical data as optical data signals to the read circuit 106 in accordance with output selection signals, whereby the optical data is read. The read optical data is stored in the memory circuit in the data processing circuit 107.

Then, the arithmetic circuit in the data processing circuit 107 generates data of difference between the optical data generated when the light unit 104b is on and the optical data generated when the light units 104a and 104b are off. The data of difference is used as data for executing predetermined processing.

As described with FIGS. 2A and 2B, the input-output device exemplified in this embodiment has the structure shown in Embodiment 1, generates optical data at the time when the second light unit is on and optical data at the time when the first and second light units are off, and generates data of difference between these two optical data signals. By generating data of difference, data of light in the environment where the input-output device is positioned can be removed from the optical data while the advantageous effects described in Embodiment 1 are obtained; thus, the light detection accuracy can be further improved.

Embodiment 3

In this embodiment, an example of a light detection circuit in the input-output device described in Embodiments 1 and 2 will be described.

Examples of the light detection circuit in this embodiment will be described with reference to FIGS. 3A to 3D. FIGS. 3A to 3D are diagrams for explaining an example of the light detection circuit in this embodiment.

Figure 3A:
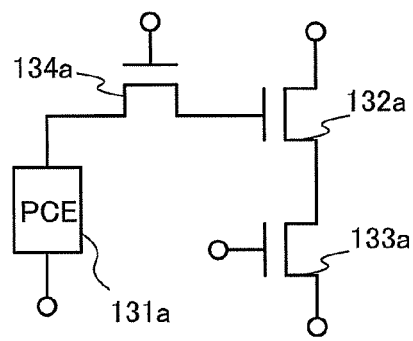
FIGS. 3A to 3D illustrate examples of a light detection circuit in Embodiment 3.
Figure 3B:
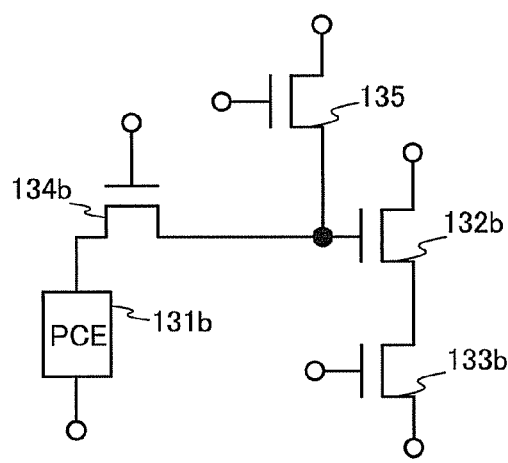

First, configuration examples of the light detection circuit in this embodiment will be described with reference to FIGS. 3A and 3B. FIGS. 3A and 3B each illustrate the configuration example of the light detection circuit in this embodiment.

The light detection circuit illustrated in FIG. 3A includes a photoelectric conversion element 131a, a transistor 132a, a transistor 133a, and a transistor 134a.

In the light detection circuit in FIG. 3A, the transistors 132a, 133a, and 134a are field-effect transistors.

The photoelectric conversion element 131a has a first current terminal and a second current terminal. A reset signal is input to the first current terminal of the photoelectric conversion element 131a.

One of a source and a drain of the transistor 134a is electrically connected to the second current terminal of the photoelectric conversion element 131a. A gate of the transistor 134a is supplied with a light-detection control signal.

A gate of the transistor 132a is electrically connected to the other of the source and the drain of the transistor 134a.

One of a source and a drain of the transistor 133a is electrically connected to one of a source and a drain of the transistor 132a. A gate of the transistor 133a is supplied with an output selection signal.

Either the other of the source and drain of the transistor 132a or the other of the source and drain of the transistor 133a is supplied with a voltage Va.

The light detection circuit in FIG. 3A outputs optical data from the rest of the other of the source and drain of the transistor 132a or the other of the source and drain of the transistor 133a, as an optical data signal.

The light detection circuit illustrated in FIG. 3B includes a photoelectric conversion element 131b, a transistor 132b, a transistor 133b, a transistor 134b, and a transistor 135.

In the light detection circuit in FIG. 3B, the transistors 132b, 133b, 134b, and 135 are field-effect transistors.

The photoelectric conversion element 131b has a first current terminal and a second current terminal. A voltage Vb is input to the first current terminal of the photoelectric conversion element 131b.

Note that one of the voltage Va and the voltage Vb is a high power supply voltage Vdd, and the other thereof is a low power supply voltage Vss. The high power supply voltage Vdd is relatively higher than the low power supply voltage Vss. The low power supply voltage Vss is relatively lower than the high power supply voltage Vdd. The values of the voltage Va and the voltage Vb are sometimes interchanged depending on the polarity of the transistors, for example. The difference between the voltage Va and the voltage Vb is a power supply voltage.

One of a source and a drain of the transistor 134b is electrically connected to the second current terminal of the photoelectric conversion element 131b. A gate of the transistor 134b is supplied with a light-detection control signal.

A gate of the transistor 132b is electrically connected to the other of the source and the drain of the transistor 134b.

A light-detection reset signal is input to a gate of the transistor 135. The voltage Va is input to one of a source and a drain of the transistor 135. The other of the source and the drain of the transistor 135 is electrically connected to the other of the source and the drain of the transistor 134b.

An output selection signal is input to a gate of the transistor 133b. One of a source and a drain of the transistor 133b is electrically connected to one of a source and a drain of the transistor 132b.

The voltage Va is input to either the other of the source and drain of the transistor 132b or the other of the source and drain of the transistor 133b.

The light detection circuit in FIG. 3B outputs optical data from the rest of the other of the source and drain of the transistor 132b or the other of the source and drain of the transistor 133b, as an optical data signal.

Next, the components of the light detection circuits illustrated in FIGS. 3A and 3B will be described.

As the photoelectric conversion elements 131a and 131b, photodiodes or phototransistors can be used, for example. When the photoelectric conversion elements 131a and 131b are photodiodes, one of an anode and a cathode of the photodiode corresponds to the first current terminal of the photoelectric conversion element, and the other of the anode and the cathode of the photodiode corresponds to the second current terminal of the photoelectric conversion element. When the photoelectric conversion elements 131a and 131b are phototransistors, one of a source and a drain of the phototransistor corresponds to the first current terminal of the photoelectric conversion element, and the other of the source and the drain of the phototransistor corresponds to the second current terminal of the photoelectric conversion element.

The transistors 132a and 132b each serve as an amplification transistor.

The transistors 134a and 134b each serve as a light-detection control transistor.

The transistor 135 serves as a light-detection reset selection transistor. Note that the transistor 135 is not necessarily provided in the light detection circuit in this embodiment; in the case where the transistor 135 is provided, the gate voltage of the transistor 132b can be reset to a desired voltage.

The transistors 133a and 133b each serve as an output selection transistor.

Examples of the transistors 132a, 132b, 133a, 133b, 134a, 134b, and 135 are a transistor including a semiconductor layer containing a semiconductor that belongs to Group 14 of the periodic table (e.g., silicon) and a transistor including an oxide semiconductor layer; a channel is formed in the semiconductor layer or the oxide semiconductor layer. For example, the use of the transistor including an oxide semiconductor layer can suppress variation in the gate voltage due to leakage current of the transistor 132a, 132b, 133a, 133b, 134a, 134b, or 135.

Next, examples of methods for driving the light detection circuits in FIGS. 3A and 3B will be described.

Figure 3C:
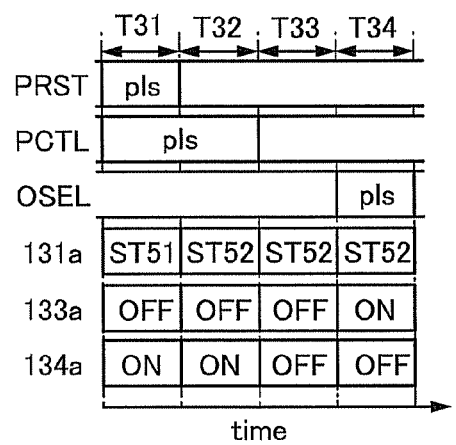

First, an example of a method for driving the light detection circuit in FIG. 3A will be described with reference to FIG. 3C. FIG. 3C is a timing chart for explaining the example of the method for driving the light detection circuit in FIG. 3A and shows the states of the light-detection reset signal, the output selection signal, the photoelectric conversion element 131a, the transistor 133a, and the transistor 134a. Here, the case where the photoelectric conversion element 131a is a photodiode is described as an example.

In the example of the method for driving the light detection circuit in FIG. 3A, first, a pulse of the light-detection reset signal is input in a period T31. Moreover, a pulse of the light-detection control signal is input in the period T31 and a period T32. Note that in the period T31, the timing of starting input of the pulse of the light-detection reset signal may be earlier than the timing of starting input of the pulse of the light-detection control signal.

At this time, in the period T31, the photoelectric conversion element 131a is set in a state where current flows in the forward direction (also referred to as a state ST51), the transistor 134a is turned on, and the transistor 133a is turned off.

At that time, the gate voltage of the transistor 132a is reset to a given value.

Next, in the period T32 after the input of the pulse of the light-detection reset signal, the photoelectric conversion element 131a is set in a state where voltage is applied in the reverse direction (also referred to as a state ST52), and the transistor 133a remains off.

At this time, a photocurrent flows between the first current terminal and the second current terminal of the photoelectric conversion element 131a in accordance with the illuminance of light entering the photoelectric conversion element 131a. Further, the level of the gate voltage of the transistor 132a varies in accordance with the photocurrent. At this time, the value of the channel resistance between the source and the drain of the transistor 132a is changed.

Then, in a period T33 after the input of the pulse of the light-detection control signal, the transistor 134a is turned off.

At this time, the gate voltage of the transistor 132a is kept at a value corresponding to the photocurrent of the photoelectric conversion element 131a in the period T32. Note that the period T33 is not necessarily provided; however, in the case where there is the period T33, the timing of outputting an optical data signal in the light detection circuit can be set as appropriate. For example, the timing of outputting an optical data signal can be set as appropriate in a plurality of light detection circuits.

Next, in a period T34, a pulse of the output selection signal is input.

At this time, the photoelectric conversion element 131a remains in the state ST52, the transistor 133a is turned on, and a current flows through the source and drain of the transistor 132a and the source and drain of the transistor 133a. The current flowing through the source and drain of the transistor 132a and the source and drain of the transistor 133a depends on the level of the gate voltage of the transistor 132a. Therefore, optical data has a value corresponding to the illuminance of light entering the photoelectric conversion element 131a. Further, the light detection circuit in FIG. 3A outputs an optical data signal from the rest of the other of the source and drain of the transistor 132a or the other of the source and drain of the transistor 133a. The above is the example of the method for driving the light detection circuit in FIG. 3A.

Figure 3D:
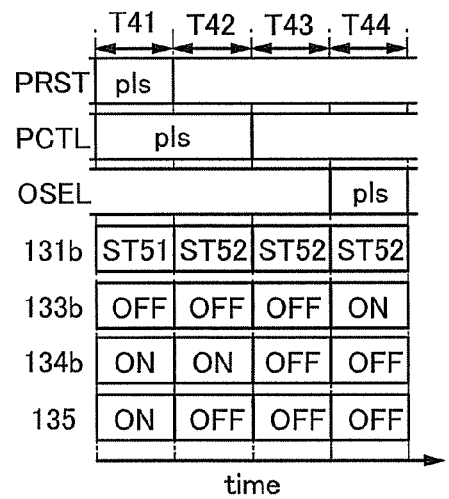

Next, an example of a method for driving the light detection circuit in FIG. 3B will be described with reference to FIG. 3D. FIG. 3D is a diagram for explaining the example of the method for driving the light detection circuit in FIG. 3B.

In the example of the method for driving the light detection circuit in FIG. 3B, first, a pulse of the light-detection reset signal is input in a period T41. In addition, a pulse of the light-detection control signal is input in the period T41 and a period T42. Note that in the period T41, the timing of starting input of the pulse of the light-detection reset signal may be earlier than the timing of starting input of the pulse of the light-detection control signal.

At that time, in the period T41, the photoelectric conversion element 131b is set in the state ST51 and the transistor 134b is turned on, so that the gate voltage of the transistor 132b is reset to a value equivalent to the voltage Va.

Then, in the period T42 after the input of the pulse of the light-detection reset signal, the photoelectric conversion element 131b is set in the state ST52, the transistor 134b remains on, and the transistor 135 is turned off.

At this time, a photocurrent flows between the first current terminal and the second current terminal of the photoelectric conversion element 131b in accordance with the illuminance of light entering the photoelectric conversion element 131b. Further, the level of the gate voltage of the transistor 132b varies in accordance with the photocurrent. At this time, the value of the channel resistance between the source and the drain of the transistor 132b is changed.

Then, in a period T43 after input of the pulse of the light-detection control signal, the transistor 134b is turned off.

At that time, the gate voltage of the transistor 132b is kept at a value corresponding to the photocurrent of the photoelectric conversion element 131b in the period T42. Note that the period T43 is not necessarily provided; however, in the case where there is the period T43, the timing of outputting an optical data signal in the light detection circuit can be set as appropriate. For example, the timing of outputting an optical data signal can be set as appropriate in a plurality of light detection circuits.

Then, in a period T44, a pulse of the output selection signal is input.

At this time, the photoelectric conversion element 131b remains in the state ST52 and the transistor 133b is turned on.

When the transistor 133b is turned on, the light detection circuit in FIG. 3B outputs an optical data signal from the rest of the other of the source and drain of the transistor 132b or the other of the source and drain of the transistor 133b. A current flowing through the source and drain of the transistor 132b and the source and drain of the transistor 133b depends on the level of the gate voltage of the transistor 132b. Therefore, optical data has a value corresponding to the illuminance of light entering the photoelectric conversion element 131b. The above is the example of the method for driving the light detection circuit in FIG. 3B.

As described with FIGS. 3A to 3D, the light detection circuit exemplified in this embodiment includes a photoelectric conversion element, a light-detection control transistor, and an amplification transistor. The light detection circuit generates optical data in accordance with a light-detection control signal and outputs the optical data as a data signal in accordance with an output selection signal. With the above structure, optical data can be generated and output by the light detection circuit.

Embodiment 4

In this embodiment, an example of a display circuit in the input-output device described in Embodiments 1 and 2 will be described.

Examples of the display circuit in this embodiment will be described with reference to FIGS. 4A to 4D. FIGS. 4A to 4D are diagrams for explaining an example of the display circuit in this embodiment.

Figure 4A:
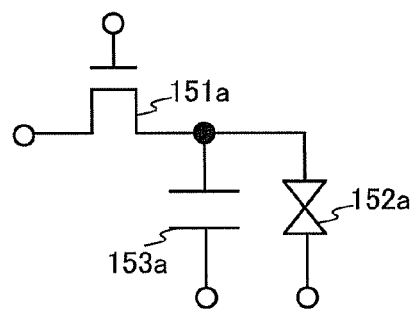
FIGS. 4A to 4D illustrate examples of a display circuit in Embodiment 4.
Figure 4C:
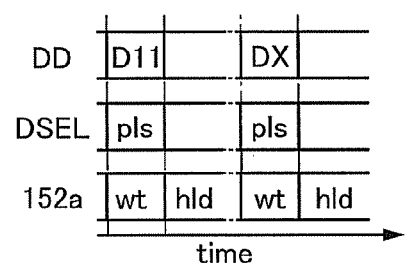
Figure 4B:
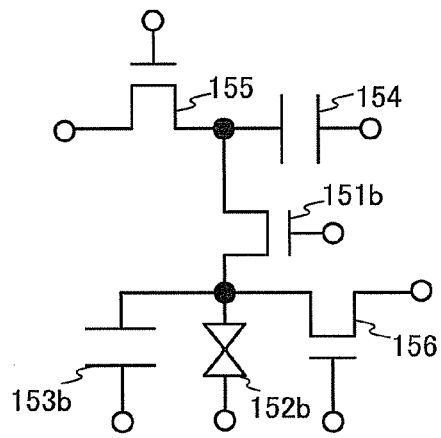

First, configuration examples of the display circuit in this embodiment will be described with reference to FIGS. 4A and 4B. FIGS. 4A and 4B each illustrate the configuration example of the display circuit in this embodiment.

The display circuit illustrated in FIG. 4A includes a transistor 151a, a liquid crystal element 152a, and a capacitor 153a.

In the display circuit in FIG. 4A, the transistor 151a is a field-effect transistor.

In the input-output device, a liquid crystal element includes a first display electrode, a second display electrode, and a liquid crystal layer. The light transmittance of the liquid crystal layer is changed in accordance with a voltage applied between the first display electrode and the second display electrode.

Further, in the input-output device, a capacitor includes a first capacitor electrode, a second capacitor electrode, and a dielectric layer overlapping with the first capacitor electrode and the second capacitor electrode. The capacitor accumulates electric charge in accordance with a voltage applied between the first capacitor electrode and the second capacitor electrode.

A display data signal is input to one of a source and a drain of the transistor 151a. A display selection signal is input to a gate of the transistor 151a.

A first display electrode of the liquid crystal element 152a is electrically connected to the other of the source and the drain of the transistor 151a. A voltage Vc is input to a second display electrode of the liquid crystal element 152a. The level of the voltage Vc can be set as appropriate.

A first capacitor electrode of the capacitor 153a is electrically connected to the other of the source and the drain of the transistor 151a. The voltage Vc is input to a second capacitor electrode of the capacitor 153a.

The display circuit illustrated in FIG. 4B includes a transistor 151b, a liquid crystal element 152b, a capacitor 153b, a capacitor 154, a transistor 155, and a transistor 156.

In the display circuit in FIG. 4B, the transistors 151b, 155, and 156 are field-effect transistors.

A display data signal is input to one of a source and a drain of the transistor 155. A write selection signal (a signal WSEL) which is a pulse signal is input to a gate of the transistor 155. The write selection signal can be generated, for example, by output of a pulse signal from a shift register included in a circuit.

A first capacitor electrode of the capacitor 154 is electrically connected to the other of the source and the drain of the transistor 155. The voltage Vc is input to a second capacitor electrode of the capacitor 154.

One of a source and a drain of the transistor 151b is electrically connected to the other of the source and the drain of the transistor 155. A display selection signal is input to a gate of the transistor 151b.

A first display electrode of the liquid crystal element 152b is electrically connected to the other of the source and the drain of the transistor 151b. The voltage Vc is input to a second display electrode of the liquid crystal element 152b.

A first capacitor electrode of the capacitor 153b is electrically connected to the other of the source and the drain of the transistor 151b. The voltage Vc is input to a second capacitor electrode of the capacitor 153b. The level of the voltage Vc is set as appropriate in accordance with specifications of the display circuit.

A reference voltage is input to one of a source and a drain of the transistor 156. The other of the source and the drain of the transistor 156 is electrically connected to the other of the source and the drain of the transistor 151b. A display reset signal (a signal DRST) which is a pulse signal is input to a gate of the transistor 156.

Next, the components of the display circuits illustrated in FIGS. 4A and 4B will be described.

The transistors 151a and 151b each serve as a display selection transistor.

As a liquid crystal layer in the liquid crystal elements 152a and 152b, a liquid crystal layer that transmits light when a voltage applied to the first display electrode and the second display electrode is 0 V can be used. For example, it is possible to use a liquid crystal layer including electrically controlled birefringence liquid crystal (ECB liquid crystal), liquid crystal to which dichroic dye is added (GH liquid crystal), polymer-dispersed liquid crystal, or discotic liquid crystal. Alternatively, a liquid crystal layer exhibiting a blue phase may be used. The liquid crystal layer exhibiting a blue phase contains, for example, a liquid crystal composition including a liquid crystal exhibiting a blue phase and a chiral agent. The liquid crystal exhibiting a blue phase has a short response time of 1 msec or less and is optically isotropic; therefore, alignment treatment is not necessary and the viewing angle dependence is small. Thus, the operation speed can be increased with the liquid crystal layer exhibiting a blue phase. For example, the field sequential input-output device in Embodiments 1 and 2 needs to have higher operation speed than a display device using a color filter, and therefore, the liquid crystal exhibiting a blue phase is preferably used in the liquid crystal element in the field sequential input-output device in Embodiments 1 and 2.

The capacitors 153a and 153b each serve as a storage capacitor; a voltage corresponding to a display data signal is applied between the first capacitor electrode and the second capacitor electrode with the transistors 151a and 151b, respectively. The capacitors 153a and 153b are not necessarily provided; in the case where the capacitors 153a and 153b are provided, variations of voltage applied to the liquid crystal element due to leakage current of the display selection transistor can be suppressed.

The capacitor 154 serves as a storage capacitor; a voltage corresponding to a display data signal is applied between the first capacitor electrode and the second capacitor electrode with the transistor 155.

The transistor 155 serves as a write selection transistor that selects whether a display data signal is input to the capacitor 154.

The transistor 156 serves as a display reset selection transistor that selects whether a voltage applied to the liquid crystal element 152b is reset.

Examples of the transistors 151a, 151b, 155, and 156 are a transistor including a semiconductor layer containing a semiconductor that belongs to Group 14 of the periodic table (e.g., silicon) and a transistor including an oxide semiconductor layer; a channel is formed in the semiconductor layer or the oxide semiconductor layer.

Next, examples of methods for driving the display circuits in FIGS. 4A and 4B will be described.

First, an example of a method for driving the display circuit in FIG. 4A will be described with reference to FIG. 4C. FIG. 4C is a timing chart for explaining the example of the method for driving the display circuit in FIG. 4A and shows the states of the display data signal and the display selection signal.

In the example of the method for driving the display circuit in FIG. 4A, the transistor 151a is turned on when a pulse of the display selection signal is input.

When the transistor 151a is turned on, the display data signal is input to the display circuit, so that the voltage of the first display electrode of the liquid crystal element 152a and the voltage of the first capacitor electrode of the capacitor 153a become equivalent to the voltage of the display data signal.

At this time, the liquid crystal element 152a is put in a write state (a state wt) and has a light transmittance corresponding to the display data signal, so that the display circuit is put in a display state corresponding to data (each of data D11 to data DX) of the display data signal.

After that, the transistor 151a is turned off, and the liquid crystal element 152a is put in a hold state (a state hld) and keeps the voltage applied between the first display electrode and the second display electrode so that the amount of variations from the initial value does not exceed a reference value until a pulse of the next display selection signal is input. Moreover, the light unit in the input-output device in Embodiments 1 and 2 is lit when the liquid crystal element 152a is in the hold state.

Figure 4D:
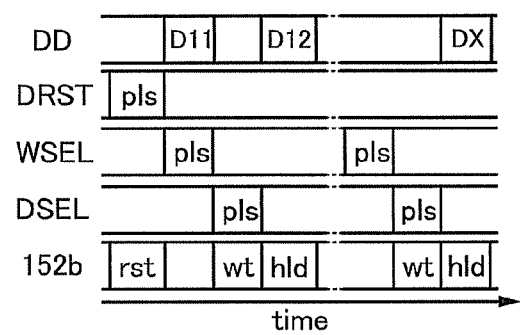

Next, an example of a method for driving the display circuit in FIG. 4B will be described with reference to FIG. 4D. FIG. 4D is a timing chart for explaining the example of the method for driving the light detection circuit in FIG. 4B.

In the example of the method for driving the light detection circuit in FIG. 4B, when a pulse of the display reset signal is input, the transistor 156 is turned on, so that the voltage of the first display electrode of the liquid crystal element 152b and the first capacitor electrode of the capacitor 153b are reset to the reference voltage.

Moreover, when a pulse of the write selection signal is input, the transistor 155 is turned on, whereby the display data signal is input to the display circuit, and the voltage of the first capacitor electrode of the capacitor 154 becomes equivalent to the voltage of the display data signal.

After that, when a pulse of the display selection signal is input, the transistor 151b is turned on, whereby the voltage of the first display electrode of the liquid crystal element 152b and the voltage of the first capacitor electrode of the capacitor 153b become equivalent to the voltage of the first capacitor electrode of the capacitor 154.

At this time, the liquid crystal element 152b is put in a write state and has a light transmittance corresponding to the display data signal, so that the display circuit is put in a display state corresponding to data (each of data D11 to data DX) of the display data signal.

After that, the transistor 151b is turned off, and the liquid crystal element 152b is put in a hold state and keeps the voltage applied between the first display electrode and the second display electrode so that the amount of variations from the initial value does not exceed a reference value until a pulse of the next display selection signal is input. Moreover, the light unit in the input-output device in Embodiments 1 and 2 is lit when the liquid crystal element 152b is in the hold state.

As described with FIGS. 4A and 4B, the display circuit exemplified in this embodiment includes a display selection transistor and a liquid crystal element. With the above structure, the display circuit can be set in a display state corresponding to a display data signal.

In addition, as described with FIG. 4B, the display circuit exemplified in this embodiment includes a write selection transistor and a capacitor in addition to a display selection transistor and a liquid crystal element. With the above structure, while the liquid crystal element is set in a display state corresponding to data of a given display data signal, data of the next display selection signal can be written into the capacitor. Consequently, the operation speed of the display circuit can be increased.

Embodiment 5

In this embodiment, an example of the second light unit in the input-output device in Embodiment 1 will be described.

Figure 5:
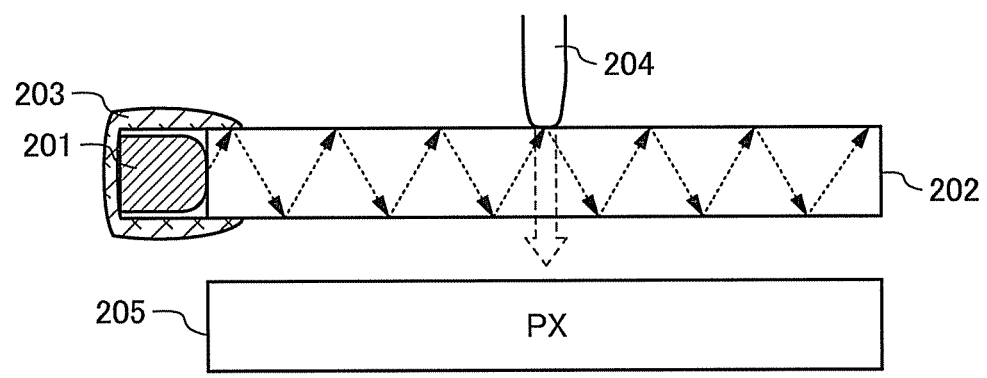
FIG. 5 is a schematic cross-sectional view illustrating a structural example of a light unit in Embodiment 5.

A structural example of a light unit in this embodiment will be described with reference to FIG. 5. FIG. 5 is a schematic view illustrating the structural example of the light unit in this embodiment.

The light unit illustrated in FIG. 5 includes a light source 201, a light guide plate 202, and a fixing material 203. Furthermore, the light unit in FIG. 5 overlaps with a light detection circuit in a pixel portion (PX) 205.

As the light source 201, a light-emitting diode that emits light in the visible light region can be used as in Embodiment 1.

The fixing material 203 has a function of fixing the light source 201 and the light guide plate 202. As the fixing material 203, a light-blocking material is preferably used. The use of a light-blocking material for the fixing material 203 can prevent light emitted from the light source 201 from leaking to the outside. Note that the fixing material 203 is not necessarily provided.

In the light unit illustrated in FIG. 5, light from the light source 201 enters the light guide plate 202. For example, when an object to be read is not in contact with the light guide plate 202, light from the light source 201 is led to total reflection in the light guide plate 202. On the other hand, when an object to be read, such as a finger 204, is in contact with the light guide plate 202, light from the light source 201 is scattered at the contact portion of the finger 204 and the light guide plate 202 and enters the light detection circuit.

The light unit in FIG. 5 may be provided with a light control circuit with which a lighting state and a non-lighting state are switched.

As described with FIG. 5, the light unit exemplified in this embodiment includes a light source and a light guide plate. Light from the light source is led to total reflection in the light guide plate. When an object to be read is in contact with the light guide plate, light reflected by the object enters a light detection circuit at the contact portion. The above structure can reduce adverse effects of light in the environment where the input-output device is positioned.

Embodiment 6

In this embodiment, a transistor that can be applied to the transistor in the input-output device described in the above embodiment will be described.

As the transistor in the input-output device described in the above embodiment, it is possible to use a transistor including an oxide semiconductor layer or a semiconductor layer containing a semiconductor that belongs to Group 14 of the periodic table (e.g., silicon), in which a channel is formed. Note that a layer in which a channel is formed is also referred to as a channel formation layer.

The semiconductor layer may be a single crystal semiconductor layer, a polycrystalline semiconductor layer, a microcrystalline semiconductor layer, or an amorphous semiconductor layer.

Another example of an transistor including an oxide semiconductor layer, which is applicable to the input-output device described in the above embodiment, is a transistor including an oxide semiconductor layer that becomes intrinsic (i-type) or substantially intrinsic by purification. Note that purification means the following concepts: removal of hydrogen in an oxide semiconductor layer as much as possible, and reduction of defects due to oxygen vacancy in the oxide semiconductor layer by supply of oxygen to the oxide semiconductor layer.

Examples of structures of the transistor including the oxide semiconductor layer will be described with reference to FIGS. 6A to 6D. FIGS. 6A to 6D are schematic cross-sectional diagrams each illustrating an example of the structure of a transistor in this embodiment.

Figure 6A:
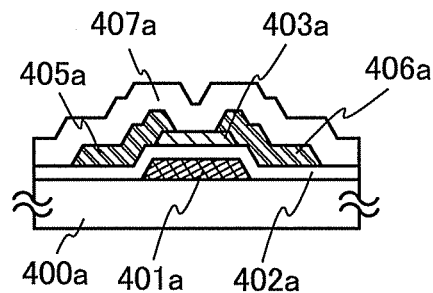
FIGS. 6A to 6D are schematic cross-sectional views each illustrating a structural example of a transistor in Embodiment 6.

The transistor illustrated in FIG. 6A has a bottom-gate structure and is also referred to as an inverted staggered transistor.

The transistor in FIG. 6A includes a conductive layer 401a, an insulating layer 402a, an oxide semiconductor layer 403a, a conductive layer 405a, and a conductive layer 406a.

The conductive layer 401a is provided over a substrate 400a. The insulating layer 402a is provided over the conductive layer 401a. The oxide semiconductor layer 403a overlaps the conductive layer 401a with the insulating layer 402a placed therebetween. The conductive layer 405a and the conductive layer 406a are provided over part of the oxide semiconductor layer 403a.

In FIG. 6A, part of a top surface of the oxide semiconductor layer 403a (part of the oxide semiconductor layer 403a over which the conductive layers 405a and 406a are not positioned) in the transistor is in contact with an oxide insulating layer 407a.

Figure 6B:
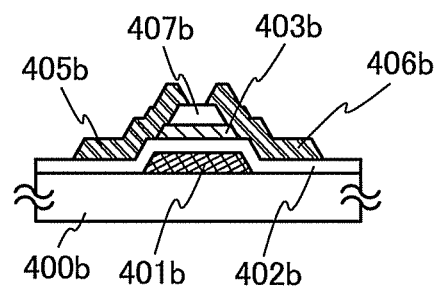

The transistor illustrated in FIG. 6B is a channel protective (channel-stop) transistor which is one of bottom-gate transistors, and is also referred to as an inverted staggered transistor.

The transistor in FIG. 6B includes a conductive layer 401b, an insulating layer 402b, an oxide semiconductor layer 403b, a conductive layer 405b, a conductive layer 406b, and an oxide insulating layer 407b.

The conductive layer 401b is provided over a substrate 400b. The insulating layer 402b is provided over the conductive layer 401b. The oxide semiconductor layer 403b overlaps the conductive layer 401b with the insulating layer 402b placed therebetween. The oxide insulating layer 407b is provided over the oxide semiconductor layer 403b. The conductive layer 405b and the conductive layer 406b are provided over part of the oxide semiconductor layer 403b with the oxide insulating layer 407b placed therebetween.

Figure 6C:
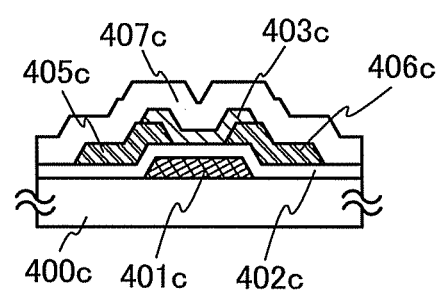

The transistor illustrated in FIG. 6C is one of bottom-gate transistors.

The transistor in FIG. 6C includes a conductive layer 401c, an insulating layer 402c, an oxide semiconductor layer 403c, a conductive layer 405c, and a conductive layer 406c.

The conductive layer 401c is provided over a substrate 400c. The insulating layer 402c is provided over the conductive layer 401c. The conductive layer 405c and the conductive layer 406c are formed over part of the insulating layer 402c. The oxide semiconductor layer 403c overlaps the conductive layer 401c with the insulating layer 402c placed therebetween.

Further, in FIG. 6C, a top surface and a side surface of the oxide semiconductor layer 403c in the transistor are in contact with the oxide insulating layer 407c.

Note that in FIGS. 6A to 6C, a protective insulating layer may be provided over the oxide insulating layer.

Figure 6D:
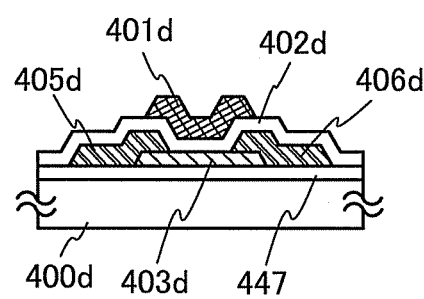

The transistor illustrated in FIG. 6D is one of top-gate transistors.

The transistor in FIG. 6D includes a conductive layer 401d, an insulating layer 402d, an oxide semiconductor layer 403d, a conductive layer 405d, and a conductive layer 406d.

The oxide semiconductor layer 403d is provided over a substrate 400d with an insulating layer 447 placed therebetween. The conductive layer 405d and the conductive layer 406d are provided over the oxide semiconductor layer 403d. The insulating layer 402d is provided over the oxide semiconductor layer 403d, the conductive layer 405d, and the conductive layer 406d. The conductive layer 401d overlaps the oxide semiconductor layer 403d with the insulating layer 402d placed therebetween.

Next, the components illustrated in FIGS. 6A to 6D will be described.

Each of the substrates 400a to 400d can be, for example, a light-transmitting substrate such as a glass substrate or a plastic substrate.

The insulating layer 447 functions as a base layer preventing diffusion of an impurity element from the substrate 400d.

The insulating layer 447 can be, for example, a silicon nitride layer, a silicon oxide layer, a silicon nitride oxide layer, a silicon oxynitride layer, an aluminum oxide layer, or an aluminum oxynitride layer. Alternatively, the insulating layer 447 can be a stack of layers of materials that can be used for the insulating layer 447.

Each of the conductive layers 401a to 401d functions as a gate of the transistor. Note that a layer functioning as a gate of the transistor can be called a gate electrode or a gate wiring.

Note that the transistor in this embodiment may include a conductive layer that overlaps the conductive layer to be the gate with the oxide semiconductor layer placed therebetween, in addition to the components of the transistor illustrated in FIGS. 6A to 6D. The conductive layer also functions as a gate of the transistor. With the above structure, the threshold voltage of the transistor can be controlled, and entry of light into the oxide semiconductor layer can be prevented.

As the conductive layers 401a to 401d, it is possible to use, for example, a layer of a metal material such as molybdenum, titanium, chromium, tantalum, tungsten, aluminum, copper, neodymium, or scandium or an alloy material containing any of these materials as a main component. The conductive layers 401a to 401d can also be formed by stacking layers of materials that can be used for the conductive layers 401a to 401d.

Each of the insulating layers 402a to 402d functions as a gate insulating layer of the transistor. Note that a layer functioning as a gate insulating layer of the transistor can be called a gate insulating layer.

As the insulating layers 402a to 402c, a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, or a hafnium oxide layer can be used, for example. The insulating layers 402a to 402c can also be formed by stacking layers of materials that can be used for the insulating layers 402a to 402c. Moreover, the insulating layer 402d can be an oxide insulating layer such as a silicon oxide layer.

Each of the oxide semiconductor layers 403a to 403d serves as a layer in which a channel of the transistor is formed. Examples of an oxide semiconductor applicable to the oxide semiconductor layers 403a to 403d include at least one element selected from In, Ga, Sn, Zn, Al, Mg, Hf, and lanthanoid. For example, examples of the oxide semiconductor applicable to the oxide semiconductor layers 403a to 403d are an oxide of four metal elements, an oxide of three metal elements, and an oxide of two metal elements. As the oxide of four metal elements, an In—Sn—Ga—Zn—O-based metal oxide can be used, for example. As the oxide of three metal elements, an In—Ga—Zn—O-based metal oxide, an In—Sn—Zn—O-based metal oxide, an In—Al—Zn—O-based metal oxide, a Sn—Ga—Zn—O-based metal oxide, an Al—Ga—Zn—O-based metal oxide, a Sn—Al—Zn—O-based metal oxide, an In—Hf—Zn—O-based metal oxide, an In—La—Zn—O-based metal oxide, an In—Ce—Zn—O-based metal oxide, an In—Pr—Zn—O-based metal oxide, an In—Nd—Zn—O-based metal oxide, an In—Pm—Zn—O-based metal oxide, an In—Sm—Zn—O-based metal oxide, an In—Eu—Zn—O-based metal oxide, an In—Gd—Zn—O-based metal oxide, an In—Tb—Zn—O-based metal oxide, an In—Dy—Zn—O-based metal oxide, an In—Ho—Zn—O-based metal oxide, an In—Er—Zn—O-based metal oxide, an In—Tm—Zn—O-based metal oxide, an In—Yb—Zn—O-based metal oxide, or an In—Lu—Zn—O-based metal oxide can be used, for example. As the oxide of two metal elements, an In—Zn—O-based metal oxide, a Sn—Zn—O-based metal oxide, an Al—Zn—O-based metal oxide, a Zn—Mg—O-based metal oxide, a Sn—Mg—O-based metal oxide, an In—Mg—O-based metal oxide, an In—Sn—O-based metal oxide, or an In—Ga—O-based metal oxide can be used, for example. In addition, an In—O-based metal oxide, a Sn—O-based metal oxide, a Zn—O-based metal oxide, or the like can also be used as the oxide semiconductor. Further, the metal oxide that can be used as the oxide semiconductor may contain silicon oxide.

In the case of using an In—Zn—O-based metal oxide, a semiconductor layer of an In—Zn—O-based metal oxide can be formed, for example, using an oxide target that has a composition ratio of In:Zn=50:1 to 1:2 in an atomic ratio ($In_2O_3$:ZnO=25:1 to 1:4 in a molar ratio), preferably In:Zn=20:1 to 1:1 in an atomic ratio ($In_2O_3$:ZnO=10:1 to 1:2 in a molar ratio), further preferably In:Zn=15:1 to 1.5:1 ($In_2O_3$:ZnO=15:2 to 3:4 in a molar ratio). For example, when the atomic ratio of the target used for forming the In—Zn—O-based oxide semiconductor is expressed by In:Zn:O=P:Q:R, the relation of R>1.5P+Q is satisfied. An increase in the amount of indium can increase the mobility of the transistor.

As the oxide semiconductor, a material represented by $InMO_3(ZnO)_m$ (m is larger than 0) can also be used. Here, M in $InMO_3(ZnO)_m$ represents one or more metal elements selected from Ga, Al, Mn, and Co.

The conductive layers 405a to 405d and the conductive layers 406a to 406d function as a source or a drain of the transistor. Note that a layer functioning as a source of the transistor can be called a source electrode or a source wiring, and a layer functioning as a drain of the transistor can be called a drain electrode or a drain wiring.

Each of the conductive layers 405a to 405d and the conductive layers 406a to 406d can be, for example, a layer of a metal material such as aluminum, chromium, copper, tantalum, titanium, molybdenum, or tungsten or an alloy material containing any of these metal materials as a main component. Alternatively, each of the conductive layers 405a to 405d and the conductive layers 406a to 406d can be a stack of layers of materials applicable to the conductive layers 405a to 405d and the conductive layers 406a to 406d.

Alternatively, the conductive layers 405a to 405d and the conductive layers 406a to 406d can be formed using a layer containing conductive metal oxide. Examples of the conductive metal oxide are indium oxide, tin oxide, zinc oxide, an alloy of indium oxide and tin oxide, and an alloy of indium oxide and zinc oxide. Note that the conductive metal oxide applicable to the conductive layers 405a to 405d and the conductive layers 406a to 406d may contain silicon oxide.

As the oxide insulating layers 407a to 407c, a silicon oxide layer can be used, for example. Note that the oxide insulating layer 407b serves as a layer protecting a channel formation layer of the transistor (also referred to as a channel protective layer).

Note that the transistor in this embodiment does not necessarily have the structure where the entire oxide semiconductor layer overlaps with the conductive layer serving as a gate electrode as illustrated in FIGS. 6A to 6D; in the case of employing the structure where the entire oxide semiconductor layer overlaps with the conductive layer serving as a gate electrode, entry of light into the oxide semiconductor layer can be prevented.

Next, as an example of a method for manufacturing the transistor in this embodiment, an example of a method for manufacturing the transistor in FIG. 6A will be described with reference to FIGS. 7A to 7E. FIGS. 7A to 7E are schematic cross-sectional views illustrating an example of a method for manufacturing the transistor in FIG. 6A.

Figure 7A:
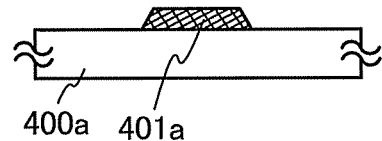
FIGS. 7A to 7E are schematic cross-sectional views illustrating an example of a process for manufacturing the transistor illustrated in FIG. 6A.

First, as illustrated in FIG. 7A, the substrate 400a is prepared, a first conductive film is formed over the substrate 400a, and part of the first conductive film is etched to form the conductive layer 401a.

For example, the first conductive film can be formed by formation of a film of a material applicable to the conductive layer 401a by sputtering. Alternatively, the first conductive film can be formed by stacking films of materials that can be used for the conductive layer 401a.

When a high-purity gas from which impurities such as hydrogen, water, a hydroxyl group, or a hydride are removed is used as a sputtering gas, the impurity concentration of a film to be formed can be reduced.

Note that before the film is formed by sputtering, preheat treatment may be performed in a preheating chamber of a sputtering apparatus. By the preheat treatment, impurities such as hydrogen or moisture can be eliminated.

Moreover, before the film is formed by sputtering, it is possible to perform the following treatment (called reverse sputtering): instead of applying a voltage to the target side, an RF power source is used for applying a voltage to the substrate side in an argon, nitrogen, helium, or oxygen atmosphere so that plasma is generated to modify a surface where the film is to be formed. With reverse sputtering, powdery substances (also referred to as particles or dust) attached to the surface where the film is to be formed can be removed.

In the case where the film is formed by sputtering, moisture remaining in a deposition chamber used for forming the film can be removed with an entrapment vacuum pump. As the entrapment vacuum pump, a cryopump, an ion pump, or a titanium sublimation pump can be used, for example. Moreover, moisture remaining in the deposition chamber can be removed with a turbo pump provided with a cold trap.

Alternatively, the conductive layer 401a can be formed in the following manner, for example: a resist mask is formed over part of the first conductive film in a photolithography process and the first conductive film is etched using the resist mask. In that case, the resist mask is removed after the conductive layer 401a is formed.

Note that the resist mask may be formed by an inkjet method. Since an inkjet method does not need a photomask, manufacturing costs can be reduced. Alternatively, the resist mask may be formed using a light-exposure mask having a plurality of regions with different transmittances (also referred to as a multi-tone mask). With a multi-tone mask, a resist mask having different thicknesses can be formed, and the number of resist masks used for manufacturing the transistor can be reduced.

Figure 7B:
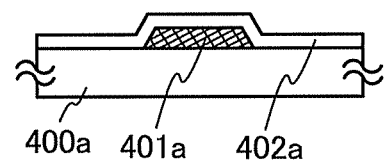

Next, as illustrated in FIG. 7B, the insulating layer 402a is formed by formation of a first insulating film over the conductive layer 401a.

For example, the first insulating film can be formed by formation of a film of a material applicable to the insulating layer 402a by sputtering, plasma CVD, or the like. The first insulating film can also be formed by stacking films of materials that can be used for the insulating layer 402a. Moreover, when a film of a material applicable to the insulating layer 402a is formed by high-density plasma CVD (e.g., high-density plasma CVD using microwaves at a frequency of 2.45 GHz), the insulating layer 402a can be dense and has an improved breakdown voltage.

Figure 7C:
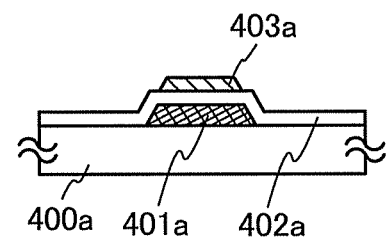

Next, an oxide semiconductor film is formed over the insulating layer 402a and then part of the oxide semiconductor film is etched, whereby the oxide semiconductor layer 403a is formed as illustrated in FIG. 7C.

For example, the oxide semiconductor film can be formed by formation of a film of an oxide semiconductor material applicable to the oxide semiconductor layer 403a by sputtering. Note that the oxide semiconductor film may be formed in a rare gas atmosphere, an oxygen atmosphere, or a mixed atmosphere of a rare gas and oxygen.

The oxide semiconductor film can be formed using an oxide target having a composition ratio of $In_2O_3:Ga_2O_3:ZnO=1:1:1$ [molar ratio] as a sputtering target. Alternatively, the oxide semiconductor film may be formed using an oxide target having a composition ratio of $In_2O_3:Ga_2O_3:ZnO=1:1:2$ [molar ratio], for example.

When the oxide semiconductor film is formed by sputtering, the substrate 400a may be placed under reduced pressure and heated to 100 C.° to 600 C.°, preferably 200 C.° to 400 C.°. By heating the substrate 400a, the concentration of impurities in the oxide semiconductor film can be reduced and damage to the oxide semiconductor film during the sputtering can be reduced.

Alternatively, the oxide semiconductor layer 403a can be formed in the following manner, for example: a resist mask is formed over part of the oxide semiconductor film in a photolithography process and the oxide semiconductor film is etched using the resist mask. In that case, the resist mask is removed after the oxide semiconductor film is etched.

Figure 7D:
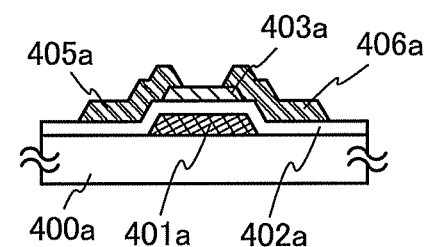

Next, as illustrated in FIG. 7D, a second conductive film is formed over the insulating layer 402a and the oxide semiconductor layer 403a, and part of the second conductive film is etched to form the conductive layers 405a and 406a.

For example, the second conductive film can be formed by formation of a film of a material applicable to the conductive layers 405a and 406a by sputtering. Alternatively, the second conductive film can be formed by stacking films of materials applicable to the conductive layers 405a and 406a.

Alternatively, the conductive layers 405a and 406a can be formed in the following manner, for example: a resist mask is formed over part of the second conductive film in a photolithography process and the second conductive film is etched using the resist mask. In that case, the resist mask is removed after the conductive layers 405a and 406a are formed.

Figure 7E:
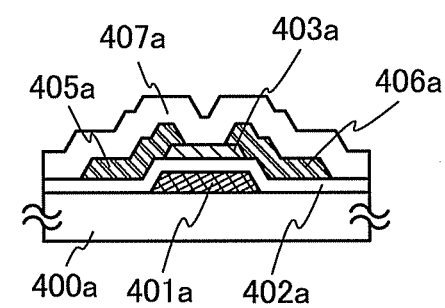

Then, as illustrated in FIG. 7E, the oxide insulating layer 407a is formed so as to be contact with the oxide semiconductor layer 403a.

For example, the oxide insulating layer 407a can be formed by formation of a film applicable to the oxide insulating layer 407a by sputtering in a rare gas (typically, argon) atmosphere, an oxygen atmosphere, or a mixed atmosphere of a rare gas and oxygen. The oxide insulating layer 407a formed by sputtering can suppress a reduction in resistance of a portion of the oxide semiconductor layer 403a, which serves as a back channel of the transistor. The temperature of the substrate at the time when the oxide insulating layer 407a is formed preferably ranges from room temperature to 300 C.°.

Before formation of the oxide insulating layer 407a, plasma treatment with the use of a gas such as $N_2O$, $N_2$, or Ar may be performed to remove water or the like adsorbed on an exposed surface of the oxide semiconductor layer 403a. In the case of performing the plasma treatment, the oxide insulating layer 407a is preferably formed after the plasma treatment without exposure to air.

Further, in the example of the method for manufacturing the transistor in FIG. 6A, heat treatment is performed, for example, at 400° C. or higher and 750° C. or lower, or 400° C. or higher and lower than the strain point of the substrate. For example, the heat treatment is performed after the oxide semiconductor film is formed, after part of the oxide semiconductor film is etched, after the second conductive film is formed, after part of the second conductive film is etched, or after the oxide insulating layer 407a is formed.

A heat treatment apparatus for the heat treatment can be an electric furnace or an apparatus for heating an object by heat conduction or heat radiation from a heating element such as a resistance heating element. For example, a rapid thermal annealing (RTA) apparatus such as a gas rapid thermal annealing (GRTA) apparatus or a lamp rapid thermal annealing (LRTA) apparatus can be used. An LRTA apparatus is an apparatus for heating an object to be processed by radiation of light (an electromagnetic wave) emitted from a lamp such as a halogen lamp, a metal halide lamp, a xenon arc lamp, a carbon arc lamp, a high-pressure sodium lamp, or a high-pressure mercury lamp. A GRTA apparatus is an apparatus for heat treatment using a high-temperature gas. As the high-temperature gas, a rare gas or an inert gas (e.g., nitrogen) that does not react with an object by the heat treatment can be used.

Further, after the heat treatment, a high-purity oxygen gas, a high-purity $N_2O$ gas, or ultra-dry air (having a dew point −40° C. or lower, preferably −60° C. or lower) may be introduced in the furnace where the heat treatment has been performed while the heating temperature is maintained or the temperature is decreased from the heating temperature. In that case, it is preferable that the oxygen gas or the $N_2O$ gas do not contain water, hydrogen, and the like. The purity of the oxygen gas or the $N_2O$ gas which is introduced into the heat treatment apparatus is preferably 6N or more, further preferably 7N or more (i.e., the impurity concentration of the oxygen gas or the $N_2O$ gas is preferably 1 ppm or lower, further preferably 0.1 ppm or lower). By the effect of the oxygen gas or the $N_2O$ gas, oxygen is supplied to the oxide semiconductor layer 403a, so that the oxide semiconductor layer 403a can be purified.

Besides the above heat treatment, heat treatment (preferably at 200° C. to 400° C., for example at 250° C. to 350° C.) may be performed in an inert gas atmosphere or an oxygen gas atmosphere after the oxide insulating layer 407a is formed.

Oxygen doping using oxygen plasma may be performed after the insulating layer 402a is formed, after the oxide semiconductor film is formed, after the conductive layers serving as the source electrode and the drain electrode are formed, after the oxide insulating layer is formed, or after the heat treatment is performed. For example, oxygen doping may be performed using a high-density plasma of 2.45 GHz. The oxygen doping can reduce variations in electrical characteristics of transistors to be manufactured.

Through the above steps, impurities such as hydrogen, moisture, a hydroxyl group, or a hydride (also referred to as a hydrogen compound) are removed from the oxide semiconductor layer 403a, and in addition, oxygen is supplied to the oxide semiconductor layer 403a by the effect of the oxygen gas or the $N_2O$ gas. Consequently, defects due to oxygen vacancy in the oxide semiconductor layer 403a can be reduced.

The example of the method for manufacturing the transistor, which is shown in this embodiment, does not necessarily apply only to the transistor in FIG. 6A. For example, if any of the components illustrated in FIGS. 6B to 6D has the same designation as the components in FIG. 6A and has a function, at least part of which is the same as that of the components in FIG. 6A, the description of the example of the method for manufacturing the transistor in FIG. 6A can be employed as appropriate.

As described with FIGS. 6A to 6D and FIGS. 7A to 7E, the transistor exemplified in this embodiment includes a conductive layer serving as a gate; an insulating layer serving as a gate insulating layer; an oxide semiconductor layer that overlaps the conductive layer serving as the gate, with the insulating layer serving as the gate insulating layer placed therebetween, in which a channel is formed; a conductive layer that is electrically connected to the oxide semiconductor layer and serves as one of a source and a drain; and a conductive layer that is electrically connected to the oxide semiconductor layer and serves as the other of the source and the drain.

The oxide semiconductor layer in which the channel is formed is an oxide semiconductor layer that is made to be intrinsic (i-type) or substantially intrinsic by purification. By purification of the oxide semiconductor layer, the carrier concentration of the oxide semiconductor layer can be lower than $1\times10^{14}/cm^3$, preferably lower than $1\times10^{12}/cm^3$, further preferably lower than $1\times10^{11}/cm^3$; thus, variation in characteristics due to temperature change can be suppressed. With the above structure, the off-state current of the transistor per 1 μm of channel width can be reduced to 10 aA ($1\times10^{-17}$ A) or lower, 1 aA ($1\times10^{-18}$ A) or lower, 10 zA ($1\times10^{-20}$ A) or lower, further reduced to 1 zA ($1\times10^{-21}$ A) or lower, and still further reduced to 100 yA ($1\times10^{-22}$ A) or lower. It is preferable that the off-state current of the transistor be as low as possible. The lowest value of the off-state current of the transistor in this embodiment is estimated to be about $10^{-30}$ A/μm.

Next, as for the transistor including the oxide semiconductor layer exemplified in this embodiment, an example of calculating the off-state current by leakage current measurement with a circuit for evaluating characteristics will be described below.

Figure 8A:
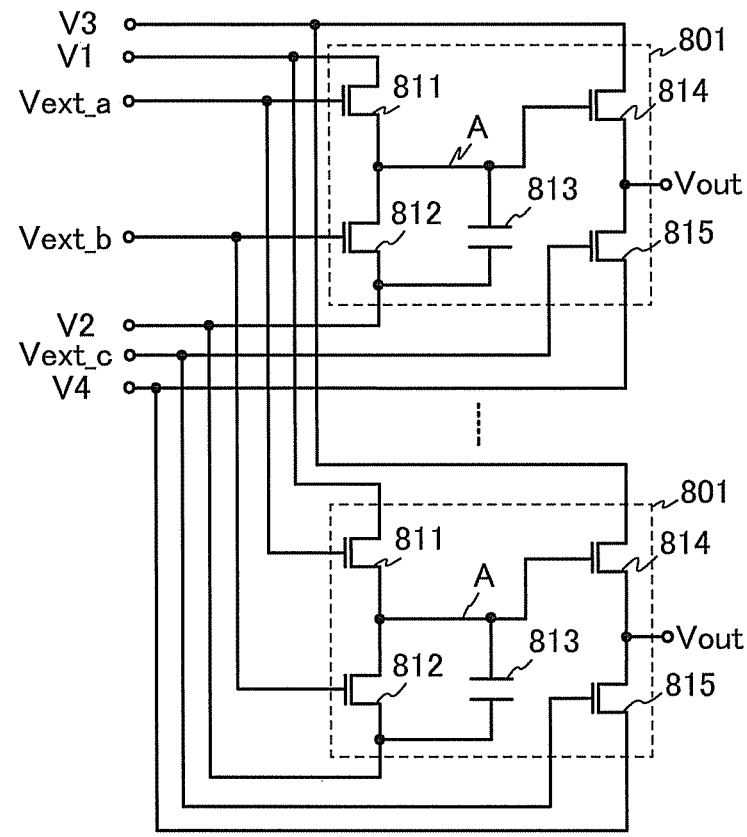
FIGS. 8A and 8B are diagrams for explaining a circuit for evaluating characteristics.
Figure 8B:
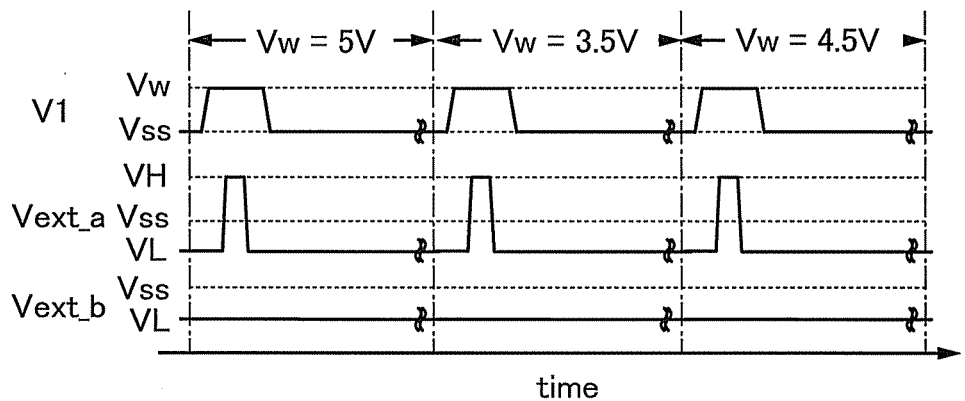

Leakage current measurement using a circuit for evaluating characteristics will be described with reference to FIGS. 8A and 8B. FIGS. 8A and 8B are diagrams for explaining a circuit for evaluating characteristics.

First, a configuration of a circuit for evaluating characteristics is described with reference to FIG. 8A. FIG. 8A is a circuit diagram illustrating the configuration of the circuit for evaluating characteristics.

The circuit for evaluating characteristics illustrated in FIG. 8A includes a plurality of measurement systems 801. The plurality of measurement systems 801 are connected in parallel with each other. Here, as an example, eight measurement systems 801 are connected in parallel with each other. By using the plurality of measurement systems 801, a plurality of leakage currents can be measured at the same time.

The measurement system 801 includes a transistor 811, a transistor 812, a capacitor 813, a transistor 814, and a transistor 815.

A voltage V1 is input to one of a source and a drain of the transistor 811. A voltage Vext_a is input to a gate of the transistor 811. The transistor 811 is a transistor for injecting charge.

One of a source and a drain of the transistor 812 is connected to the other of the source and the drain of the transistor 811. A voltage V2 is input to the other of the source and the drain of the transistor 812. A voltage Vext_b is input to a gate of the transistor 812. The transistor 812 is a transistor for evaluating leakage current. Note that "leakage current" in this embodiment refers to a leakage current including an off-state current of the transistor.

A first capacitor electrode of the capacitor 813 is connected to the other of the source and the drain of the transistor 811. The voltage V2 is input to a second capacitor electrode of the capacitor 813. Here, the voltage V2 is 0 V.

A voltage V3 is input to one of a source and a drain of the transistor 814. A gate of the transistor 814 is connected to the other of the source and the drain of the transistor 811. Note that a portion where the gate of the transistor 814, the other of the source and the drain of the transistor 811, the one of the source and the drain of the transistor 812, and the first capacitor electrode of the capacitor 813 are connected to each other is referred to as a node A. Here, the voltage V3 is 5 V.

One of a source and a drain of the transistor 815 is connected to the other of the source and the drain of the transistor 814. A voltage V4 is input to the other of the source and the drain of the transistor 815. A voltage Vext_c is input to a gate of the transistor 815. Here, the voltage Vext_c is 0.5 V.

The measurement system 801 outputs a voltage at a portion where the other of the source and the drain of the transistor 814 is connected to the one of the source and the drain of the transistor 815, as an output voltage Vout.

Here, as an example of the transistor 811, a transistor that includes an oxide semiconductor layer and has a channel length L of 10 μm and a channel width W of 10 μm is used. As an example of the transistors 814 and 815, a transistor that includes an oxide semiconductor layer and has a channel length L of 3 μm and a channel width W of 100 μm is used. Moreover, as an example of the transistor 812, a bottom-gate transistor that includes an oxide semiconductor layer is used. In the transistor, a source electrode and a drain electrode are in contact with an upper part of the oxide semiconductor layer, a region where the source and drain electrodes overlap with a gate electrode is not provided, and an offset region with a width of 1 μm is provided. By providing the offset region, parasitic capacitance can be reduced. Further, as the transistor 812, six samples (SMP) of transistors having different channel lengths L and channel widths W are used (see Table 1).

TABLE 1

|  | L [μm] | W [μm] |
|---|---|---|
| SMP1 | 1.5 | $1 \times 10^5$ |
| SMP2 | 3 | $1 \times 10^5$ |
| SMP3 | 10 | $1 \times 10^5$ |
| SMP4 | 1.5 | $1 \times 10^6$ |
| SMP5 | 3 | $1 \times 10^6$ |
| SMP6 | 10 | $1 \times 10^6$ |

The transistor for injecting charge and the transistor for evaluating leakage current are separately provided as illustrated in FIG. 8A, so that the transistor for evaluating leakage current can be always kept off while electric charge is injected. In the case where the transistor for injecting charge is not provided, the transistor for evaluating leakage current needs to be turned on once at the time of charge injection. In that case, if the transistor requires a long time to reach a steady off state from an on state, it takes a long time for measurement.

In addition, the transistor for injecting charge and the transistor for evaluating leakage current are separately provided, whereby each transistor can have an appropriate size. When the channel width W of the transistor for evaluating leakage current is made larger than that of the transistor for injecting charge, leakage current components of the circuit for evaluating characteristics other than the leakage current of the transistor for evaluating leakage current can be made relatively small. As a result, the leakage current of the transistor for evaluating leakage current can be measured with high accuracy. In addition, since the transistor for evaluating leakage current does not need to be turned on at the time of charge injection, the measurement is not adversely affected by variation in the voltage of the node A, which is caused when part of electric charge in the channel formation region flows into the node A.

On the other hand, when the channel width W of the transistor for injecting charge is made smaller than that of the transistor for evaluating leakage current, the leakage current of the transistor for injecting charge can be relatively small. Further, the measurement is less adversely affected by variation in the voltage of the node A, which is caused when part of charge in the channel formation region flows into the node A at the time of charge injection.

Next, a method for measuring a leakage current of the circuit for evaluating characteristics illustrated in FIG. 8A will be described with reference to FIG. 8B. FIG. 8B is a timing chart for explaining the method for measuring a leakage current with use of the circuit for evaluating characteristics illustrated in FIG. 8A.

In the method for measuring the leakage current with the circuit for evaluating characteristics illustrated in FIG. 8A, a write period and a hold period are provided. The operation in each period is described below.

In the write period, a voltage VL (−3 V) with which the transistor 812 is turned off is input as the voltage Vext_b. Moreover, a write voltage Vw is input as the voltage V1, and then, a voltage VH (5 V) with which the transistor 811 is turned on is input as the voltage Vext_a for a given period. Thus, electric charge is accumulated in the node A, and the voltage of the node A becomes equivalent to the write voltage Vw. Then, the voltage VL with which the transistor 811 is turned off is input as the voltage Vext_a. After that, a voltage VSS (0 V) is input as the voltage V1.

In the hold period, the amount of change in the voltage of the node A, caused by change in the amount of the electric charge held in the node A, is measured. From the amount of change in the voltage, the value of the current flowing between the source electrode and the drain electrode of the transistor 812 can be calculated. In the above manner, electric charge can be accumulated in the node A, and the amount of change in the voltage of the node A can be measured.

Accumulation of electric charge in the node A and measurement of the amount of change in the voltage of the node A (also referred to as an accumulation and measurement operation) are repeatedly performed. First, a first accumulation and measurement operation is repeated 15 times. In the first accumulation and measurement operation, a voltage of 5 V is input as the write voltage Vw in the write period and retained for 1 hour in the hold period. Next, a second accumulation and measurement operation is repeated twice. In the second accumulation and measurement operation, a voltage of 3.5 V is input as the write voltage Vw in the write period and retained for 50 hours in the hold period. Next, a third accumulation and measurement operation is performed once. In the third accumulation and measurement operation, a voltage of 4.5 V is input as the write voltage Vw in the write period and retained for 10 hours in the hold period. By repeating the accumulation and measurement operation, the measured current value can be confirmed to be the value in the steady state. In other words, the transient current (a current component that decreases over time after the measurement starts) can be removed from a current $I_A$ flowing through the node A. Consequently, the leakage current can be measured with higher accuracy.

In general, a voltage $V_A$ of the node A is expressed as a function of the output voltage Vout by Equation 1.

$$V_A = F(Vout) \qquad [\text{Equation 1}]$$

Electric charge $Q_A$ of the node A is expressed by Equation 2, using the voltage $V_A$ of the node A, capacitance $C_A$ connected to the node A, and a constant (const). Here, the capacitance $C_A$ connected to the node A is the sum of the capacitance of the capacitor 813 and a capacitance other than that of the capacitor 813.

$$Q_A = C_A V_A + \text{const} \qquad [\text{Equation 2}]$$

Since the current $I_A$ of the node A is the time differential of electric charge flowing into the node A (or electric charge flowing from the node A), the current $I_A$ of the node A is expressed by Equation 3.

$$I_A \equiv \frac{\Delta Q_A}{\Delta t} = \frac{C_A \cdot \Delta F(Vout)}{\Delta t} \qquad [\text{Equation 3}]$$

Here, as an example, Δt is about 54000 sec. As above, the current $I_A$ of the node A, which is the leakage current, can be calculated with the capacitance $C_A$ connected to the node A and the output voltage Vout, so that the leakage current of the circuit for evaluating characteristics can be obtained.

Next, the results of measuring the output voltage by the measurement method using the above circuit for evaluating characteristics and the value of the leakage current of the circuit for evaluating characteristics, which is calculated from the measurement results, will be described with reference to FIGS. 9A and 9B.

Figure 9A:
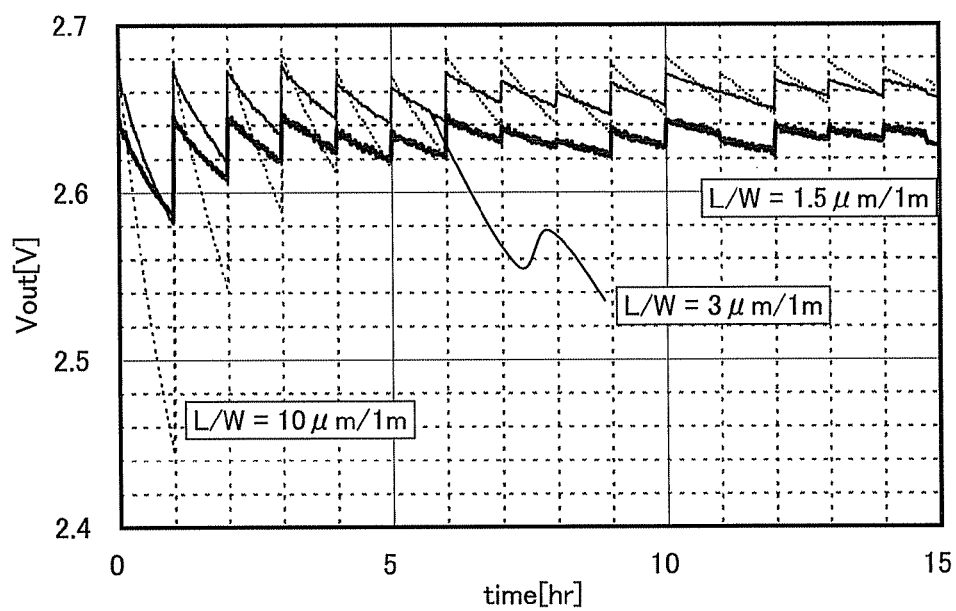
FIG. 9A is a graph showing a relation between elapsed time Time of measurement of Sample 4 (SMP4), Sample 5 (SMP5), and Sample 6 (SMP6) and output voltage Vout.
Figure 9B:
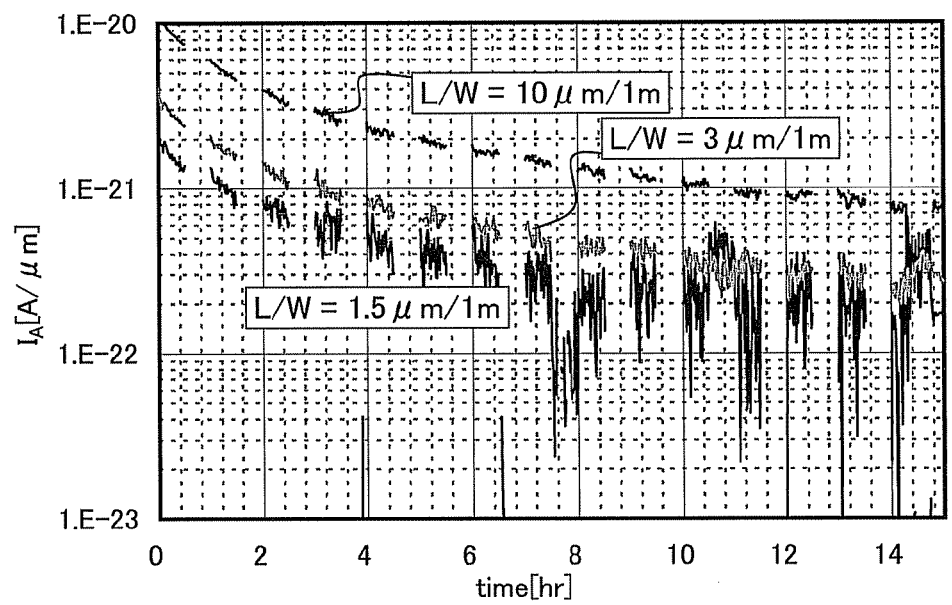
FIG. 9B is a graph showing a relation between elapsed time Time and leakage current calculated by the measurement.

As an example, FIG. 9A shows the relation between the elapsed time Time of the above measurement (the first accumulation and measurement operation) of the transistors SMP4, SMP5, and SMP6 and the output voltage Vout. FIG. 9B shows the relation between the elapsed time Time of the above measurement and the current $I_A$ calculated by the measurement. It is found that the output voltage Vout varies after the measurement starts and it takes 10 hours or longer to reach a steady state.

Figure 10:
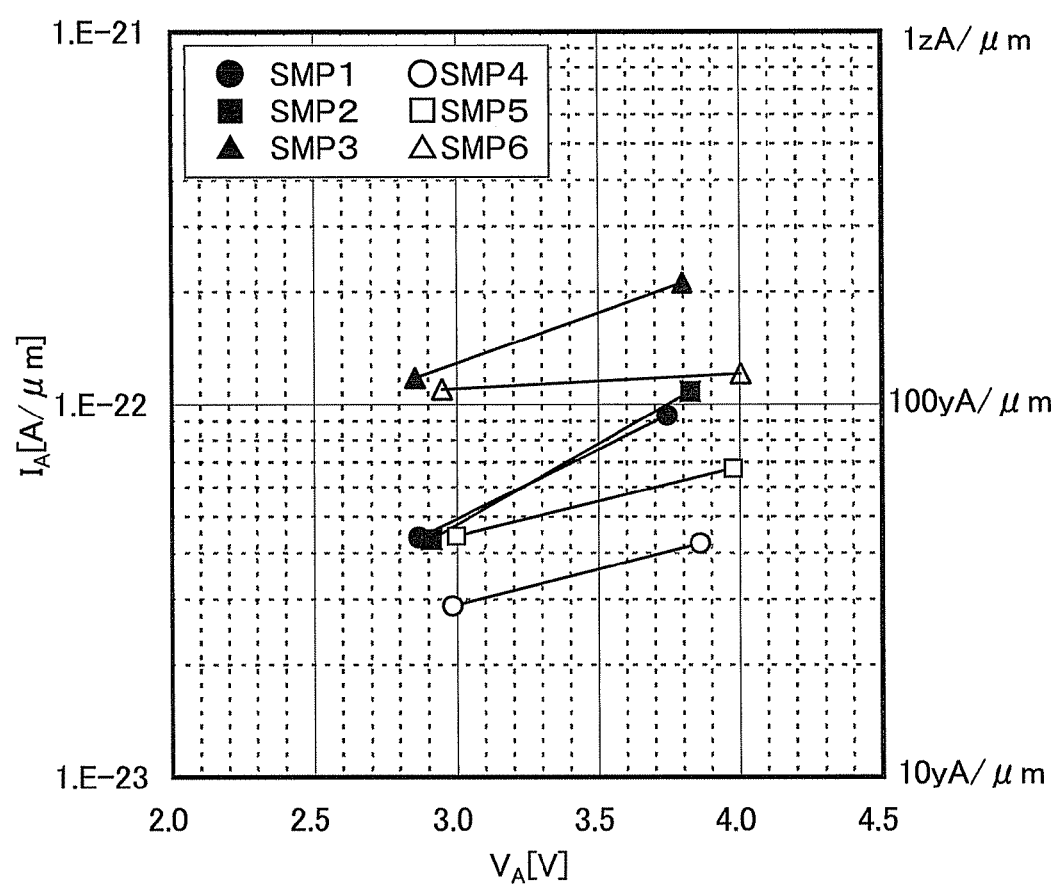
FIG. 10 is a graph showing a relation between voltage of a node A and leakage current estimated by measurement.

FIG. 10 shows the relation between the voltage of the node A in SMP1 to SMP6 and the leakage current estimated by the above measurement. In SMP4 in FIG. 10, for example, when the voltage of the node A is 3.0 V, the leakage current is 28 yA/μm. Since the leakage current includes the off-state current of the transistor 812, the off-state current of the transistor 812 can be considered to be 28 yA/μm or less.

Figure 11:
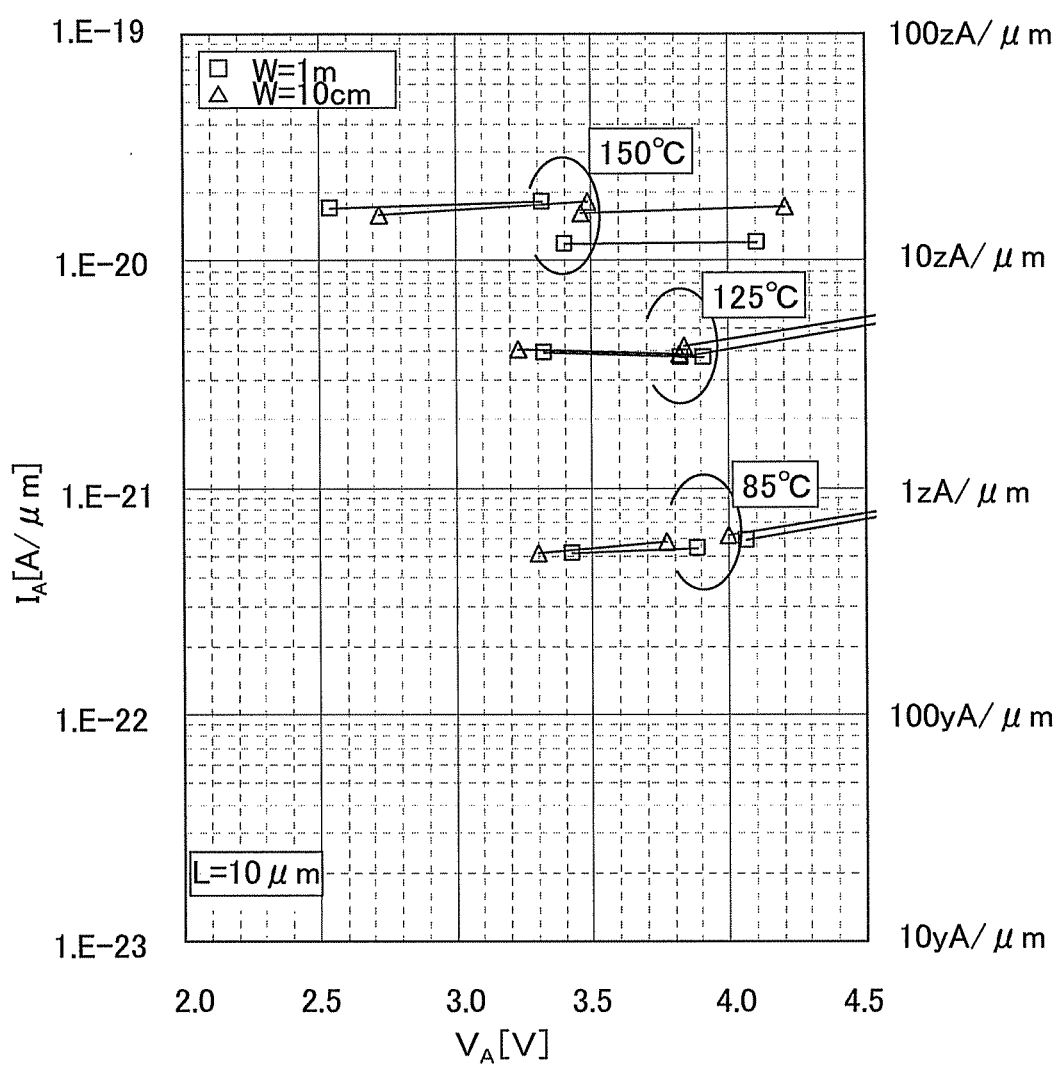
FIG. 11 is a graph showing a relation between voltage of a node A and leakage current estimated by measurement.
Figure 12:
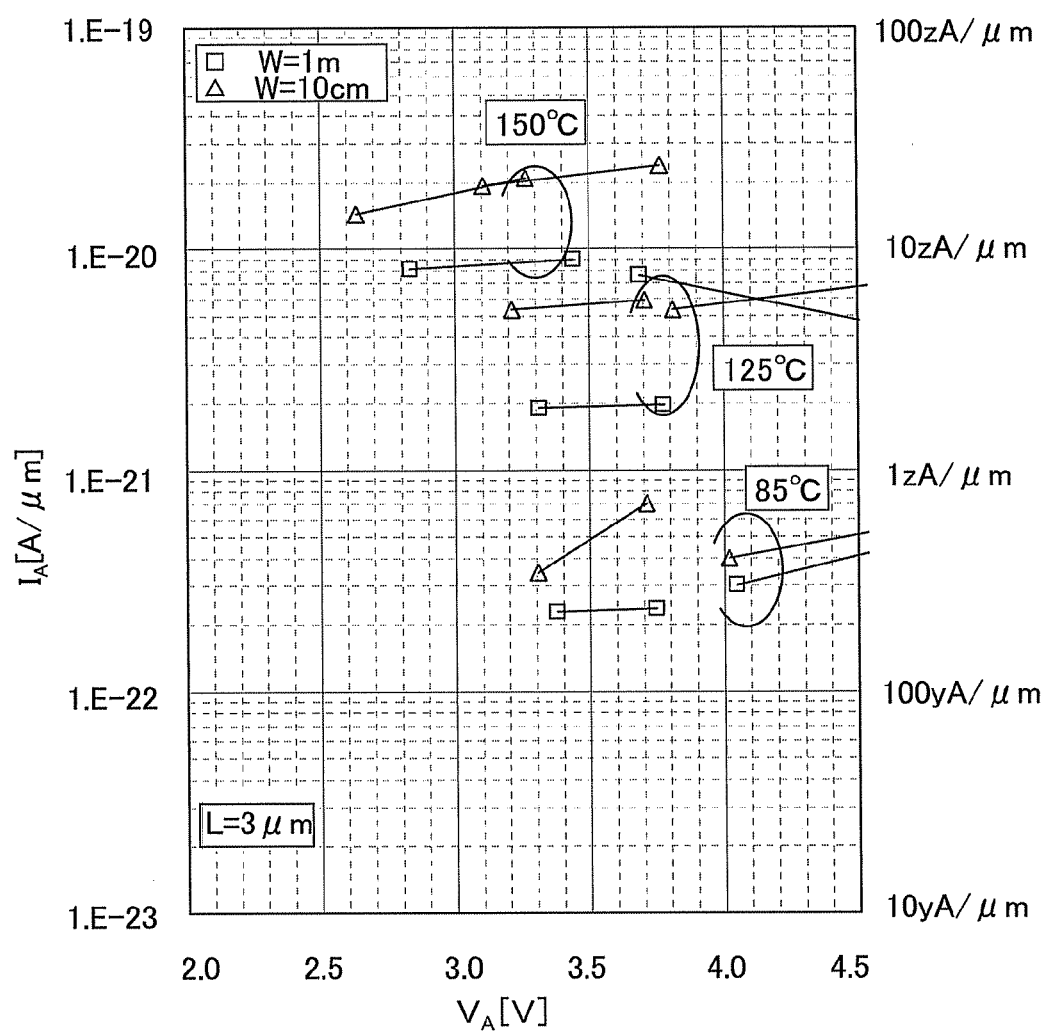
FIG. 12 is a graph showing a relation between voltage of a node A and leakage current estimated by measurement.
Figure 13:
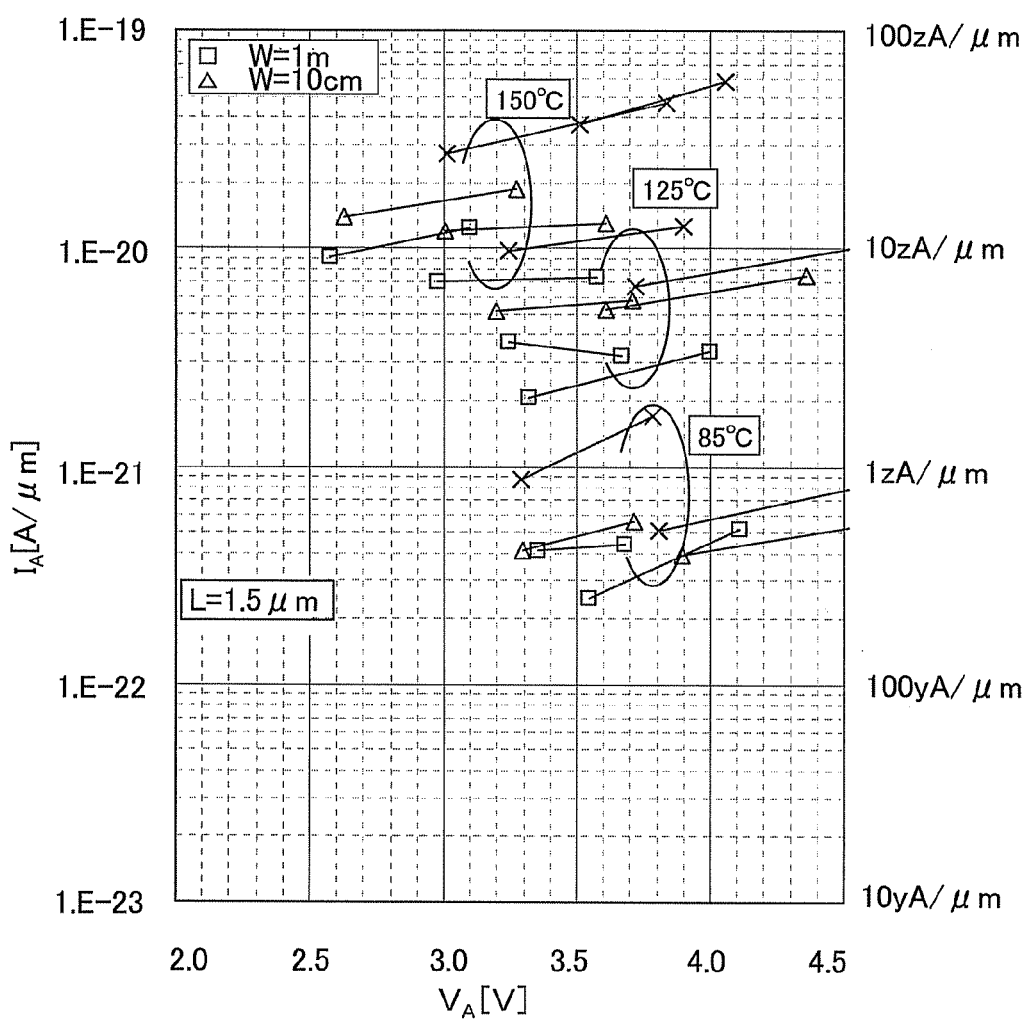
FIG. 13 is a graph showing a relation between voltage of a node A and leakage current estimated by measurement.

FIG. 11, FIG. 12, and FIG. 13 each show the relation between the voltage of the node A in SMP1 to SMP6 at 85° C., 125° C., and 150° C. and the leakage current estimated by the above measurement. As shown in FIGS. 11 to 13, the leakage current is 100 zA/μm or less even at 150° C.

As described above, the leakage current of the circuit for evaluating characteristics, including the transistor including a purified oxide semiconductor layer serving as a channel formation layer is sufficiently low, which means that the off-state current of the transistor is sufficiently low. In addition, the off-state current of the transistor is sufficiently low even when the temperature rises.

Embodiment 7

In this embodiment, a structural example of the input-output device in the above embodiment will be described.

An input-output device in this embodiment includes a first substrate (an active matrix substrate) where a semiconductor element such as a transistor is provided, a second substrate, and a liquid crystal layer provided between the first substrate and the second substrate.

Figure 14A:
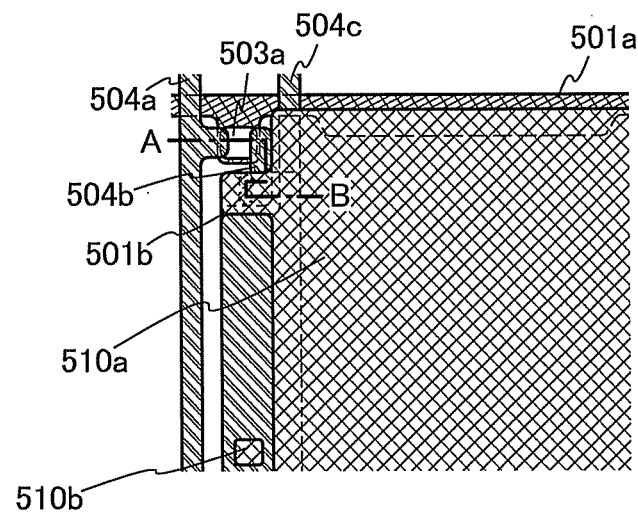
FIGS. 14A and 14B illustrate a structural example of an active matrix substrate in Embodiment 7.
Figure 14B:
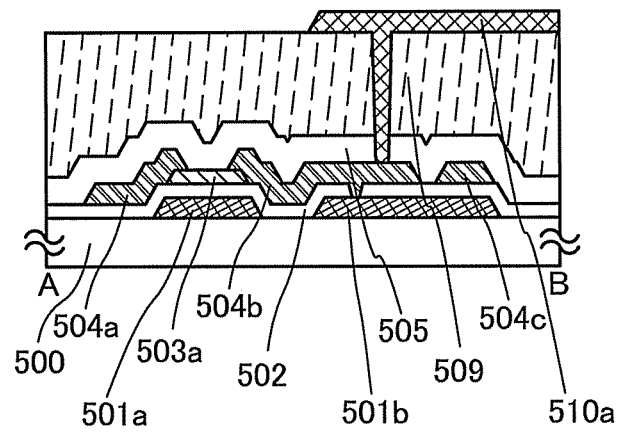
Figure 15A:
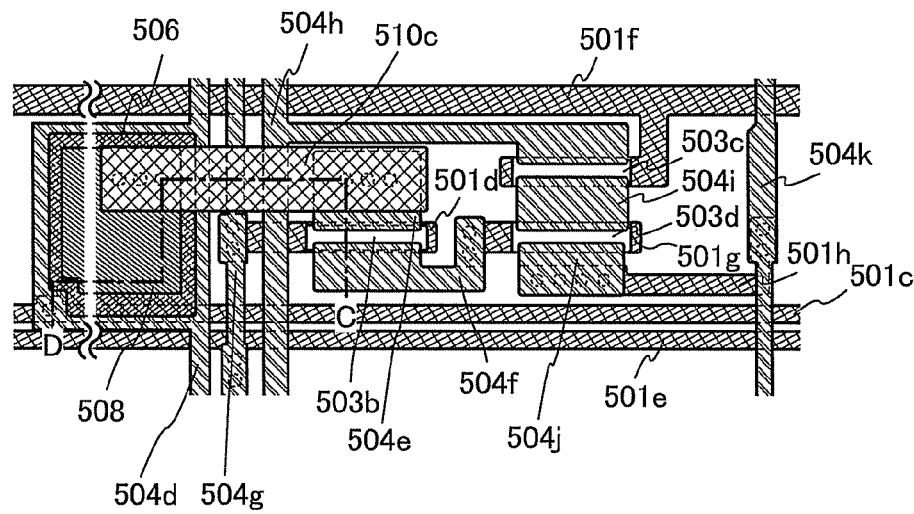
FIGS. 15A and 15B illustrate a structural example of an active matrix substrate in Embodiment 7.
Figure 15B:
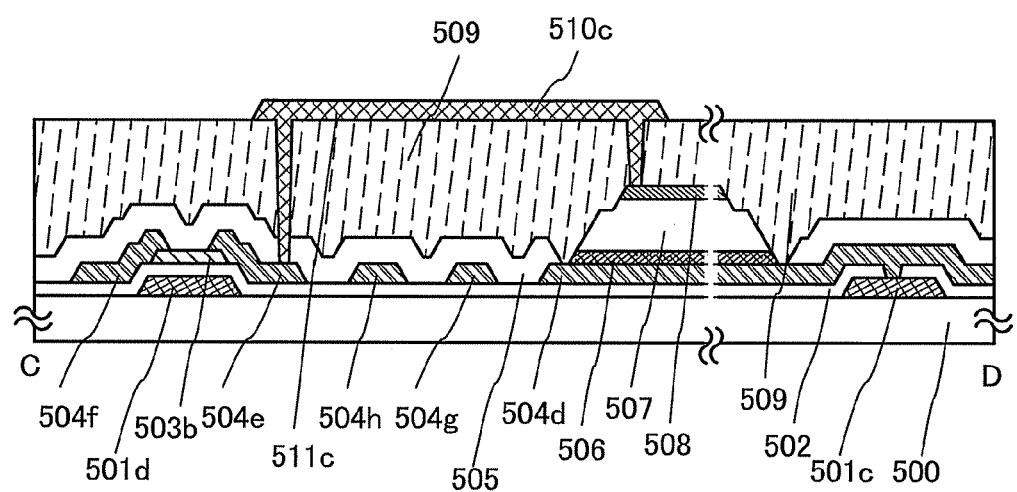

First, a structural example of the active matrix substrate in this embodiment will be described with reference to FIGS. 14A and 14B and FIGS. 15A and 15B. FIGS. 14A and 14B and FIGS. 15A and 15B illustrate a structural example of the active matrix substrate in the input-output device of this embodiment. FIG. 14A is a schematic plan view. FIG. 14B is a schematic cross-sectional view along line A-B in FIG. 14A. FIG. 15A is a schematic plan view. FIG. 15B is a schematic cross-sectional view along line C-D in FIG. 15A. Note that FIGS. 15A and 15B illustrate a light detection circuit having the structure in FIG. 3A, as an example. In addition, FIGS. 14A and 14B and FIGS. 15A and 15B illustrate a transistor having the structure in FIG. 6A, as an example.

The active matrix substrate illustrated in FIGS. 14A and 14B and FIGS. 15A and 15B includes a substrate 500, conductive layers 501a to 501h, an insulating layer 502, semiconductor layers 503a to 503d, conductive layers 504a to 504k, an insulating layer 505, a semiconductor layer 506, a semiconductor layer 507, a semiconductor layer 508, an insulating layer 509, and conductive layers 510a to 510c.

Each of the conductive layers 501a to 501h is formed over one surface of the substrate 500.

The conductive layer 501a functions as a gate of a display selection transistor in a display circuit.

The conductive layer 501b functions as a first capacitor electrode of a storage capacitor in the display circuit. Note that the layer serving as a first capacitor electrode of a capacitor (a storage capacitor) is also referred to as a first capacitor electrode.

The conductive layer 501c functions as a wiring to which the voltage Vb is input. Note that a layer having a function of a wiring can be referred to as a wiring.

The conductive layer 501d functions as a gate of a light-detection control transistor in the light detection circuit.

The conductive layer 501e functions as a signal line to which the light-detection control signal is input. Note that a layer having a function of a signal line can be referred to as a signal line.

The conductive layer 501f functions as a gate of an output selection transistor in the light detection circuit.

The conductive layer 501g functions as a gate of an amplification transistor in the light detection circuit.

The insulating layer 502 is provided over the one surface of the substrate 500 with the conductive layers 501a to 501h placed therebetween.

The insulating layer 502 functions as a gate insulating layer of the display selection transistor in the display circuit, a dielectric layer of the storage capacitor in the display circuit, a gate insulating layer of the light-detection control transistor in the light detection circuit, a gate insulating layer of the amplification transistor in the light detection circuit, and a gate insulating layer of the output selection transistor in the light detection circuit.

The semiconductor layer 503a overlaps the conductive layer 501a with the insulating layer 502 placed therebetween. The semiconductor layer 503a functions as a channel formation layer of the display selection transistor in the display circuit.

The semiconductor layer 503b overlaps the conductive layer 501d with the insulating layer 502 placed therebetween. The semiconductor layer 503b functions as a channel formation layer of the light-detection control transistor in the light detection circuit.

The semiconductor layer 503c overlaps the conductive layer 501f with the insulating layer 502 placed therebetween. The semiconductor layer 503c functions as a channel formation layer of the output selection transistor in the light detection circuit.

The semiconductor layer 503d overlaps the conductive layer 501g with the insulating layer 502 placed therebetween. The semiconductor layer 503d functions as a channel formation layer of the amplification transistor in the light detection circuit.

The conductive layer 504a is electrically connected to the semiconductor layer 503a. The conductive layer 504a functions as one of a source and a drain of the display selection transistor in the display circuit.

The conductive layer 504b is electrically connected to the conductive layer 501b and the semiconductor layer 503a. The conductive layer 504b functions as the other of the source and the drain of the display selection transistor in the display circuit.

The conductive layer 504c overlaps the conductive layer 501b with the insulating layer 502 placed therebetween. The conductive layer 504c functions as a second capacitor electrode of the storage capacitor in the display circuit.

The conductive layer 504d is electrically connected to the conductive layer 501c in an opening portion that penetrates the insulating layer 502. The conductive layer 504d functions as the one of a first current terminal and a second current terminal of a photoelectric conversion element in the light detection circuit.

The conductive layer 504e is electrically connected to the semiconductor layer 503b. The conductive layer 504e functions as one of a source and a drain of the light-detection control transistor in the light detection circuit.

The conductive layer 504f is electrically connected to the semiconductor layer 503b and is electrically connected to the conductive layer 501g in an opening portion that penetrates the insulating layer 502. The conductive layer 504f functions as the other of the source and the drain of the light-detection control transistor in the light detection circuit.

The conductive layer 504g is electrically connected to the conductive layers 501d and 501e in opening portions that penetrate the insulating layer 502. The conductive layer 504g functions as a signal line to which the light-detection control signal is input.

The conductive layer 504h is electrically connected to the semiconductor layer 503c. The conductive layer 504h functions as one of a source and a drain of the output selection transistor in the light detection circuit.

The conductive layer 504i is electrically connected to the semiconductor layers 503c and 503d. The conductive layer 504i functions as the other of the source and the drain of the output selection transistor in the light detection circuit and one of a source and a drain of the amplification transistor in the light detection circuit.

The conductive layer 504j is electrically connected to the semiconductor layer 503d and is electrically connected to the conductive layer 501h in an opening portion that penetrates the insulating layer 502. The conductive layer 504j functions as the other of the source and the drain of the amplification transistor in the light detection circuit.

The conductive layer 504k is electrically connected to the conductive layer 501h in an opening portion that penetrates the insulating layer 502. The conductive layer 504k functions as a wiring to which the voltage Va or the voltage Vb is input.

The insulating layer 505 is in contact with the semiconductor layers 503a to 503d with the conductive layers 504a to 504k placed therebetween.

The semiconductor layer 506 is electrically connected to the conductive layer 504d in an opening portion that penetrates the insulating layer 505.

The semiconductor layer 507 is in contact with the semiconductor layer 506.

The semiconductor layer 508 is in contact with the semiconductor layer 507.

The insulating layer 509 overlaps the insulating layer 505, the semiconductor layer 506, the semiconductor layer 507, and the semiconductor layer 508. The insulating layer 509 functions as a planarization insulating layer in the display circuit and the light detection circuit. Note that the insulating layer 509 is not necessarily provided.

The conductive layer 510a is electrically connected to the conductive layer 504b in an opening portion that penetrates the insulating layers 505 and 509. The conductive layer 510a functions as a pixel electrode of a display element in the display circuit. Note that a layer having a function of a pixel electrode can be referred to as a pixel electrode.

The conductive layer 510b is electrically connected to the conductive layer 504c in an opening portion that penetrates the insulating layers 505 and 509. The conductive layer 510b functions as a wiring to which the voltage Vc is input.

The conductive layer 510c is electrically connected to the conductive layer 504e in an opening portion that penetrates the insulating layers 505 and 509, and is electrically connected to the semiconductor layer 508 in an opening portion that penetrates the insulating layers 505 and 509.

Figure 16A:
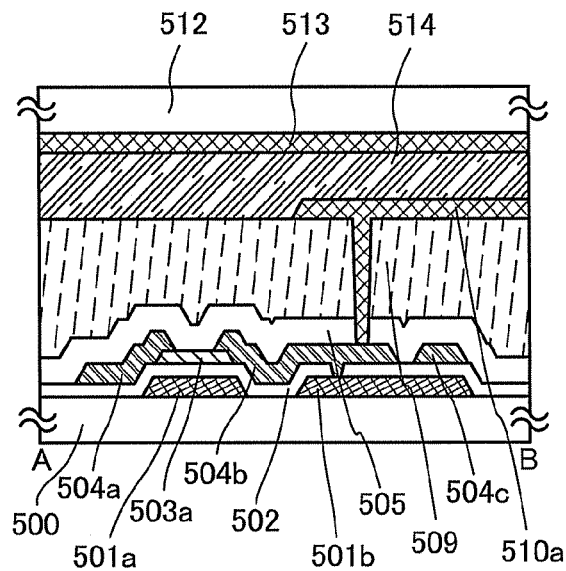
FIGS. 16A and 16B each illustrate a structural example of an input-output device in Embodiment 7.
Figure 16B:
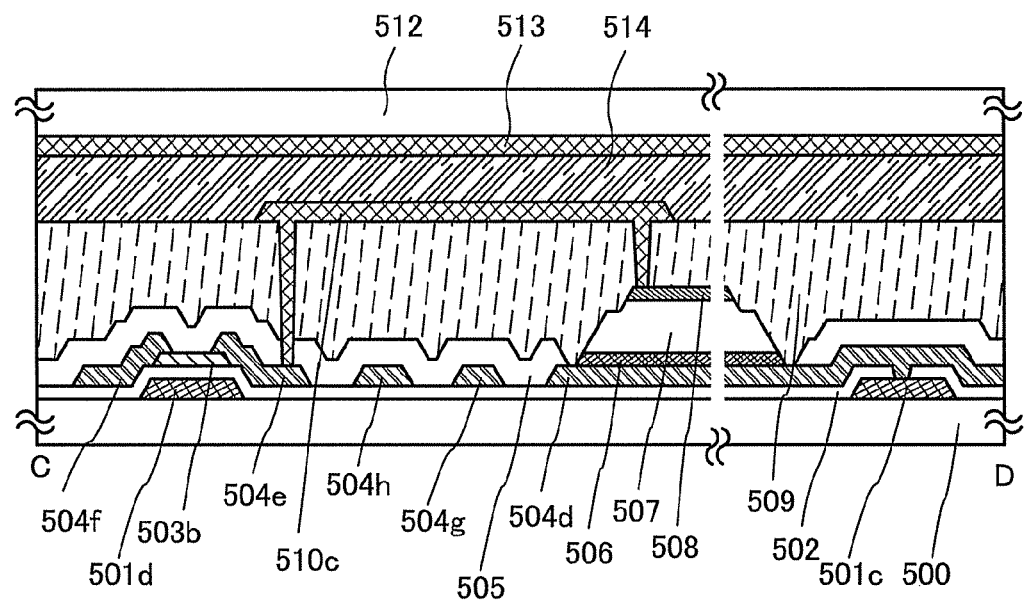

Next, a structural example of the input-output device in this embodiment will be described with reference to FIGS. 16A and 16B. FIGS. 16A and 16B are schematic cross-sectional views illustrating a structural example of the input-output device in this embodiment. FIG. 16A is a schematic cross-sectional view of a display circuit. FIG. 16B is a schematic cross-sectional view of a light detection circuit. Note that a display element in FIGS. 16A and 16B is a liquid crystal element as an example.

The input-output device illustrated in FIGS. 16A and 16B includes a substrate 512, a conductive layer 513, and a liquid crystal layer 514 in addition to the active matrix substrate illustrated in FIGS. 14A and 14B and FIGS. 15A and 15B.

The conductive layer 513 is provided on one surface of the substrate 512. The conductive layer 513 functions as a common electrode of the display circuit. Note that the conductive layer 513 is not necessarily provided in the light detection circuit.

The liquid crystal layer 514 is provided between the conductive layer 510a and the conductive layer 513 and overlaps the semiconductor layer 508 with the insulating layer 509 placed therebetween.

The conductive layer 510a, the liquid crystal layer 514, and the conductive layer 513 function as a display element in the display circuit.

Next, the components of the input-output device illustrated in FIGS. 16A and 16B will be described.

As the substrate 500 and the substrate 512, a substrate that can be applied to the substrate 400a in FIG. 6A can be used.

As the conductive layers 501a to 501h, a layer of a material applicable to the conductive layer 401a in FIG. 6A can be used. Alternatively, the conductive layers 501a to 501h may be formed by stacking layers of materials applicable to the conductive layer 401a.

As the insulating layer 502, a layer of a material applicable to the insulating layer 402a in FIG. 6A can be used. Alternatively, the insulating layer 502 may be formed by stacking layers of materials applicable to the insulating layer 402a.

As the semiconductor layers 503a to 503d, a layer of a material applicable to the oxide semiconductor layer 403a in FIG. 6A can be used. Alternatively, a semiconductor layer using a semiconductor belonging to Group 14 of the periodic table (e.g., silicon) may be used as the semiconductor layers 503a to 503d.

As the conductive layers 504a to 504k, a layer of a material applicable to the conductive layer 405a or the conductive layer 406a illustrated in FIG. 6A can be used. Alternatively, the conductive layers 504a to 504k may be formed by stacking layers of materials applicable to the conductive layer 405a or the conductive layer 406a.

As the insulating layer 505, a layer of a material applicable to the oxide insulating layer 407a in FIG. 6A can be used. Alternatively, the insulating layer 505 may be formed by stacking layers of materials applicable to the oxide insulating layer 407a.

The semiconductor layer 506 is a semiconductor layer of one conductivity type (i.e., one of a p-type semiconductor layer or an n-type semiconductor layer). As the semiconductor layer 506, a semiconductor layer containing silicon can be used, for example.

The semiconductor layer 507 has a resistance higher than that of the semiconductor layer 506. As the semiconductor layer 507, a semiconductor layer containing silicon can be used, for example.

The semiconductor layer 508 is a semiconductor layer whose conductivity type is different from that of the semiconductor layer 506 (i.e., the other of the p-type semiconductor layer and the n-type semiconductor layer). As the semiconductor layer 508, a semiconductor layer containing silicon can be used, for example.

As the insulating layer 509, a layer of an organic material such as polyimide, acrylic, or benzocyclobutene can be used, for example. Alternatively, as the insulating layer 509, a layer of a low-dielectric constant material (also referred to as a low-k material) can be used.

As the conductive layers 510a to 510c and the conductive layer 513, for example, it is possible to use a layer of a light-transmitting conductive material such as indium tin oxide, a metal oxide in which zinc oxide is mixed in indium oxide (referred to as indium zinc oxide (IZO)), a conductive material in which silicon oxide ($SiO_2$) is mixed in indium oxide, organoindium, organotin, indium oxide containing tungsten oxide, indium zinc oxide containing tungsten oxide, indium oxide containing titanium oxide, or indium tin oxide containing titanium oxide.

Alternatively, the conductive layers 510a to 510c and the conductive layer 513 can be formed using a conductive composition containing a conductive high molecule (also referred to as a conductive polymer). A conductive layer formed using the conductive composition preferably has a sheet resistance of 10000 ohms per square or less and a light transmittance of 70% or more at a wavelength of 550 nm. Furthermore, the resistivity of the conductive high molecule contained in the conductive composition is preferably less than or equal to 0.1 Ω·cm.

As the conductive high molecule, a π-electron conjugated conductive polymer can be used. Examples of the π-electron conjugated conductive polymer are polyaniline and a derivative thereof, polypyrrole and a derivative thereof, polythiophene and a derivative thereof, and a copolymer of two or more of aniline, pyrrole, and thiophene and a derivative thereof.

As the liquid crystal layer 514, a layer including TN liquid crystal, OCB liquid crystal, STN liquid crystal, VA liquid crystal, ECB liquid crystal, GH liquid crystal, polymer dispersed liquid crystal, or discotic liquid crystal can be used, for example. Note that for the liquid crystal layer 514, it is preferable to use liquid crystal that transmits light when a voltage applied to the conductive layers 510c and 513 is 0 V.

As described with FIGS. 14A and 14B, FIGS. 15A and 15B, and FIGS. 16A and 16B, the input-output device in this embodiment includes an active matrix substrate provided with a transistor, a pixel electrode, and a photoelectric conversion element; a counter substrate; and a liquid crystal layer including liquid crystal, placed between the active matrix substrate and the counter substrate. With the above structure, the display circuit and the light detection circuit can be formed over one substrate through one process; thus, manufacturing costs can be reduced.

Embodiment 8

In this embodiment, electronic devices including the input-output device in the above embodiment will be described.

Structural examples of electronic devices in this embodiment will be described with reference to FIGS. 17A to 17F. FIGS. 17A to 17F each illustrate an example of the structure of an electronic device in this embodiment.

Figure 17A:
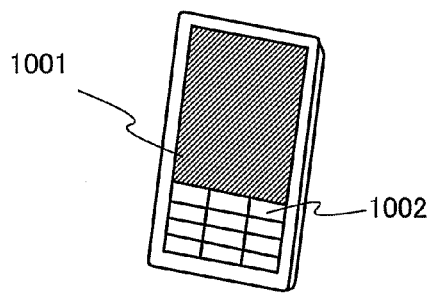
FIGS. 17A to 17F each illustrate a structural example of an electronic device in Embodiment 8.

The electronic device illustrated in FIG. 17A is a personal digital assistant. The personal digital assistant in FIG. 17A includes at least an input-output unit 1001. In the personal digital assistant in FIG. 17A, the input-output unit 1001 can be provided with an operation unit 1002, for example. By using the input-output device in the above embodiment for the input-output unit 1001, operation of the personal digital assistant or input of data to the personal digital assistant can be performed with a finger or a pen, for example.

Figure 17B:
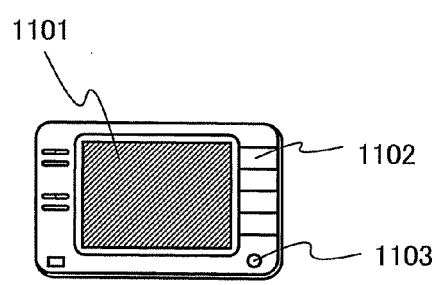

The electronic device illustrated in FIG. 17B is an information terminal with an automotive navigation system, for example. The information terminal in FIG. 17B includes an input-output unit 1101, operation buttons 1102, and an external input terminal 1103. By using the input-output device in the above embodiment for the input-output unit 1101, operation of the information terminal or input of data to the information terminal can be performed with a finger or a pen, for example.

Figure 17C:
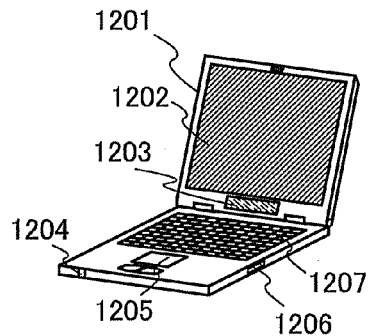

The electronic device illustrated in FIG. 17C is a laptop personal computer. The laptop personal computer in FIG. 17C includes a housing 1201, an input-output unit 1202, a speaker 1203, an LED lamp 1204, a pointing device 1205, a connection terminal 1206, and a keyboard 1207. By using the input-output device in the above embodiment for the input-output unit 1202, operation of the laptop personal computer or input of data to the laptop personal computer can be performed with a finger or a pen, for example. Further, the input-output device in the above embodiment may be used for the pointing device 1205.

Figure 17D:
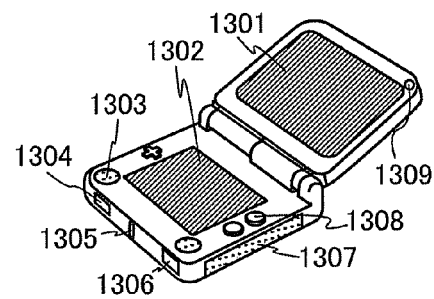

The electronic device illustrated in FIG. 17D is a portable game machine. The portable game machine in FIG. 17D includes an input-output unit 1301, an input-output unit 1302, a speaker 1303, a connection terminal 1304, an LED lamp 1305, a microphone 1306, a memory medium reading portion 1307, operation buttons 1308, and a sensor 1309. By using the input-output device in the above embodiment for the input-output unit 1301 and/or the input-output unit 1302, operation of the portable game machine or input of data to the portable game machine can be performed with a finger or a pen, for example.

Figure 17E:
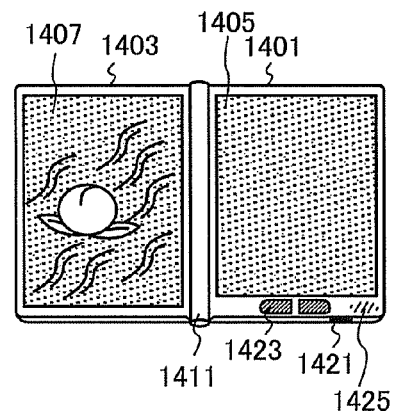

The electronic device illustrated in FIG. 17E is an e-book reader. The e-book reader in FIG. 17E includes at least a housing 1401, a housing 1403, an input-output unit 1405, an input-output unit 1407, and a hinge 1411.

The housing 1401 and the housing 1403 are connected by the hinge 1411. The e-book reader in FIG. 17E can be opened and closed with the hinge 1411 as an axis. With such a structure, the e-book reader can be handled like a paper book. The input-output unit 1405 and the input-output unit 1407 are incorporated into the housing 1401 and the housing 1403, respectively. The input-output unit 1405 and the input-output unit 1407 may display different images or may display one image, for example. In the case where different images are displayed on the input-output unit 1405 and the input-output unit 1407, for example, text can be displayed on the input-output unit on the right side (the input-output unit 1405 in FIG. 17E) and graphics can be displayed on the input-output unit on the left side (the input-output unit 1407 in FIG. 17E).

In the e-book reader illustrated in FIG. 17E, the housing 1401 or the housing 1403 may be provided with an operation unit. For example, the e-book reader in FIG. 17E can include a power button 1421, operation keys 1423, and a speaker 1425. In the e-book reader in FIG. 17E, the pages of an image can be turned with the operation keys 1423. Furthermore, the input-output unit 1405 and/or the input-output unit 1407 in the e-book reader in FIG. 17E may be provided with a keyboard, a pointing device, or the like. An external connection terminal (e.g., an earphone terminal, a USB terminal, or a terminal connectable to an AC adapter or a variety of cables such as a USB cable), a memory medium reading portion, or the like may be provided on the rear surface or the side surface of the housing 1401 and the housing 1403 of the e-book reader in FIG. 17E. The e-book reader in FIG. 17E may have a dictionary function.

By using the input-output device in the above embodiment for the input-output unit 1405 and/or the input-output unit 1407, operation of the e-book reader or input of data to the e-book reader can be performed with a finger or a pen, for example.

Figure 17F:
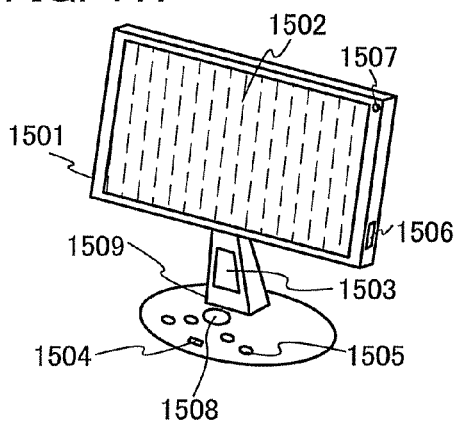

The electronic device illustrated in FIG. 17F is a display. The display in FIG. 17F includes a housing 1501, an input-output unit 1502, a speaker 1503, an LED lamp 1504, operation buttons 1505, a connection terminal 1506, a sensor 1507, a microphone 1508, and a support base 1509. By using the input-output device in the above embodiment for the input-output unit 1502, operation of the display or input of data to the display can be performed with a finger or a pen, for example.

As described with FIGS. 17A to 17F, the electronic device in this embodiment includes an input-output unit including the input-output device of the above embodiment. Such a structure can reduce adverse effects of light in the environment where the input-output device is positioned, so that the light detection accuracy of the input-output unit can be increased.

This application is based on Japanese Patent Application serial No. 2010-137080 filed with Japan Patent Office on Jun. 16, 2010, the entire contents of which are hereby incorporated by reference.

What is claimed is:

1. An input-output device comprising:
a first light unit including Z light-emitting diodes, wherein Z is a natural number of 3 or more;
a second light unit including a white light-emitting diode and a light guide plate on which light from the white light-emitting diode is incident;
X display circuits provided between the first light unit and the second light unit, configured to be supplied with a display selection signal and a display data signal in accordance with the display selection signal, and configured to be set in a display state corresponding to data of the display data signal, wherein X is a natural number; and
Y light detection circuits each provided between the first light unit and the second light unit, configured to be supplied with a light-detection control signal, and configured to generate data corresponding to illuminance of incident light in accordance with the light-detection control signal, wherein Y is a natural number of 2 or more,
wherein the Y light detection circuits form a matrix of at least 2 columns and two lines and are supplied with a same light-detection control signal such that the Y light detection circuits are driven by a global shutter method, and
wherein each of the Y light detection circuits includes:
a photoelectric conversion element including a first current terminal and a second current terminal, wherein a current flows between the first current terminal and the second current terminal in accordance with the illuminance of the incident light;
a light-detection control transistor that is a field-effect transistor including a source and a drain, one of which is electrically connected to the second current terminal of the photoelectric conversion element, and a gate configured to be supplied with the light-detection control signal, and including an oxide semiconductor layer in which a channel is formed and a carrier concentration is lower than $1\times10^{14}/cm^3$; and
an amplification transistor that is a field-effect transistor including a gate electrically connected to the other of the source and the drain of the light-detection control transistor, and a source and a drain from one of which data corresponding to the illuminance of the incident light is configured to output as a data signal.

2. The input-output device according to claim 1, wherein the photoelectric conversion element is a photodiode.

3. The input-output device according to claim 1, further comprising:
a read circuit configured to read data corresponding to the illuminance of the incident light from the Y light detection circuits; and
a data processing circuit configured to generate data of difference between two pieces of data corresponding to the illuminance of the incident light read from the read circuit.

4. The input-output device according to claim 1, wherein the Z light-emitting diodes are light-emitting diodes that emit light with a wavelength in a visible light region.

5. The input-output device according to claim 1, wherein the light from the white light-emitting diode is led to total reflection in the light guide plate.

6. The input-output device according to claim 1, wherein the white light-emitting diode is configured to emit light when the first light unit is not lit.

7. An input-output device comprising:
a first light unit including Z light-emitting diodes, wherein Z is a natural number of 3 or more;
a second light unit including a white light-emitting diode and a light guide plate on which light from the white light-emitting diode is incident;
X display circuits provided between the first light unit and the second light unit, wherein X is a natural number; and
Y light detection circuits each provided between the first light unit and the second light unit, wherein Y is a natural number of 2 or more,
wherein the Y light detection circuits form a matrix of at least 2 columns and two lines and are supplied with a same light-detection control signal such that the Y light detection circuits are driven by a global shutter method, and
wherein each of the Y light detection circuits includes:
a photoelectric conversion element;
a light-detection control transistor that is a field-effect transistor including an oxide semiconductor layer in which a channel is formed and a carrier concentration is lower than $1\times10^{14}/cm^3$; and
an amplification transistor.

8. The input-output device according to claim 7, wherein the photoelectric conversion element is a photodiode.

9. The input-output device according to claim 7, further comprising:
a read circuit configured to read data corresponding to illuminance of incident light from the Y light detection circuits; and
a data processing circuit configured to generate data of difference between two pieces of data corresponding to the illuminance of the incident light read from the read circuit.

10. The input-output device according to claim 7, wherein the Z light-emitting diodes are light-emitting diodes that emit light with a wavelength in a visible light region.

11. The input-output device according to claim 7, wherein the light from the white light-emitting diode is led to total reflection in the light guide plate.

12. The input-output device according to claim 7, wherein the white light-emitting diode is configured to emit light when the first light unit is not lit.

13. A method for driving an input-output device comprising a first light unit including Z light-emitting diodes, wherein Z is a natural number of 3 or more; a second light unit including a white light-emitting diode and a light guide plate on which light from the white light-emitting diode is incident; X display circuits provided between the first light unit and the second light unit, configured to be supplied with a display selection signal and a display data signal in accordance with the display selection signal, and configured to be set in a display state corresponding to data of the display data signal, wherein X is a natural number; and Y light detection circuits each provided between the first light unit and the second light unit, configured to be supplied with a light-detection control signal, and configured to generate data corresponding to illuminance of incident light in accordance with the light-detection control signal, wherein Y is a natural number of 2 or more, the method comprising steps of:
inputting a same light-detection control signal to each of the Y light detection circuits such that the Y light detection circuits are driven by a global shutter method;
in a frame period set by the display selection signal, making the first light unit lit by sequentially switching the Z light-emitting diodes and emitting light, and making the second light unit lit by making the white light-emitting diode emit light when the first light unit is not lit; and
generating Y pieces of data corresponding to the illuminance of the incident light in a period when the second light unit is lit,
wherein each of the Y light detection circuits includes:
a photoelectric conversion element;
a light-detection control transistor that is a field-effect transistor including an oxide semiconductor layer in which a channel is formed and a carrier concentration is lower than $1 \times 10^{14}/cm^3$; and
an amplification transistor.

14. The method for driving the input-output device according to claim 13, wherein the photoelectric conversion element is a photodiode.

15. The method for driving the input-output device according to claim 13, further comprising steps of:
reading data corresponding to the illuminance of the incident light from the Y light detection circuits; and
generating data of difference between two pieces of data corresponding to the illuminance of the incident light.

16. The method for driving the input-output device according to claim 13, wherein the Z light-emitting diodes are light-emitting diodes that emit light with a wavelength in a visible light region.

17. The method for driving the input-output device according to claim 15, wherein the light from the white light-emitting diode is led to total reflection in the light guide plate.

18. A method for driving an input-output device comprising a first light unit including Z light-emitting diodes, wherein Z is a natural number of 3 or more; a second light unit including a white light-emitting diode and a light guide plate on which light from the white light-emitting diode is incident; X display circuits provided between the first light unit and the second light unit, configured to be supplied with a display selection signal and a display data signal in accordance with the display selection signal, and configured to be set in a display state corresponding to data of the display data signal, wherein X is a natural number; and Y light detection circuits each provided between the first light unit and the second light unit, configured to be supplied with a light-detection control signal, and configured to generate data corresponding to illuminance of incident light in accordance with the light-detection control signal, wherein Y is a natural number of 2 or more, the method comprising steps of:
inputting a same light-detection control signal to each of the Y light detection circuits such that the Y light detection circuits are driven by a global shutter method;
in a frame period set by the display selection signal, making the first light unit lit by sequentially switching the Z light-emitting diodes and emitting light, and making the second light unit lit by making the white light-emitting diode emit light when the first light unit is not lit;
generating Y pieces of first data corresponding to first illuminance of the incident light in a first period when the second light unit is lit;
generating Y pieces of second data corresponding to second illuminance of the incident light in a second period when the first light unit and the second light unit are not lit; and
generating third data that is data of difference between the first data and the second data,
wherein each of the Y light detection circuits includes:
a photoelectric conversion element;
a light-detection control transistor that is a field-effect transistor including an oxide semiconductor layer in which a channel is formed and a carrier concentration is lower than $1 \times 10^{14}/cm^3$; and
an amplification transistor.

19. The method for driving the input-output device according to claim 18, wherein the photoelectric conversion element is a photodiode.

20. The method for driving the input-output device according to claim 18, further comprising steps of:
reading data corresponding to the illuminance of the incident light from the Y light detection circuits; and
generating data of difference between two pieces of data corresponding to the illuminance of the incident light.

21. The method for driving the input-output device according to claim 18, wherein the Z light-emitting diodes are light-emitting diodes that emit light with a wavelength in a visible light region.

22. The method for driving the input-output device according to claim 18, wherein the light from the white light-emitting diode is led to total reflection in the light guide plate.

* * * * *